(12) United States Patent
Frambach et al.

(10) Patent No.: US 12,224,781 B2
(45) Date of Patent: Feb. 11, 2025

(54) TRANSMITTER CIRCUIT

(71) Applicant: NXP B.V., Eindhoven (NL)

(72) Inventors: Johannes Petrus Antonius Frambach, Nijmegen (NL); Cornelis Klaas Waardenburg, Zeeland (NL); Stefan Paul van den Hoek, Winssen (NL); Gerard Arie de Wit, Wijchen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/463,174

(22) Filed: Sep. 7, 2023

(65) Prior Publication Data
US 2024/0120956 A1 Apr. 11, 2024

(30) Foreign Application Priority Data
Sep. 29, 2022 (EP) .................................... 22198853

(51) Int. Cl.
*H04B 1/04* (2006.01)
*H04L 12/40* (2006.01)

(52) U.S. Cl.
CPC ............. *H04B 1/04* (2013.01); *H04L 12/40* (2013.01); *H04L 2012/40215* (2013.01)

(58) Field of Classification Search
CPC ... H04L 12/28; H04L 12/40; H04L 12/40208; H04L 12/40215; H04L 12/40169; H04L 25/02; H04L 25/026; H04L 25/0264; H04L 25/028; H04L 25/0282; H04L 25/0284; H04L 25/0286; H04L 25/0288; H04L 25/029; H04B 10/27; H04B 10/278; H04B 1/02; H04B 1/04; H04B 1/0475; H04B 1/0483; H04B 1/62
See application file for complete search history.

(56) References Cited

U.S. PATENT DOCUMENTS

| | | | | |
|---|---|---|---|---|
| 4,700,361 A | * | 10/1987 | Todd | H04B 1/62 375/240 |
| 4,700,362 A | * | 10/1987 | Todd | H03M 3/022 704/211 |
| 6,661,300 B2 | * | 12/2003 | Heijna | H03K 3/0322 360/39 |
| 7,224,188 B2 | * | 5/2007 | Visser | H04L 25/03878 326/26 |

(Continued)

*Primary Examiner* — James M Perez

(57) ABSTRACT

A transmitter circuit including an impedance setting circuit having first and second legs, wherein each leg includes an adjustable pull-up resistance and an adjustable pull-down resistance connected in series between a supply terminal and a reference terminal. A first-leg-node, between the adjustable resistances of the first leg, is connected to a first bus terminal. A second-leg-node, between the adjustable resistances of the second leg, is connected to a second bus terminal. The controller detects a transition in a transmission data signal, and in response to a dominant to recessive transition the controller controls a voltage setting circuit to set the differential driver voltage on the bus to a recessive value; adjusts each of the adjustable pull-up resistances and the adjustable pull-down resistances with the same target impedance profile such that the transmitter circuit drives the bus with a target driver impedance for an active recessive period of a bit time.

14 Claims, 9 Drawing Sheets

(56) References Cited

U.S. PATENT DOCUMENTS

| | | | | |
|---|---|---|---|---|
| 7,257,740 | B2* | 8/2007 | Muth | H04L 25/06 714/43 |
| 7,532,046 | B2* | 5/2009 | Wolthek | H03F 3/45991 327/108 |
| 7,570,097 | B2* | 8/2009 | Frambach | H03K 3/354 331/157 |
| 8,284,848 | B2* | 10/2012 | Nam | H04B 3/00 375/244 |
| 8,368,432 | B2* | 2/2013 | Butselaar | H04L 25/028 327/108 |
| 8,395,428 | B2* | 3/2013 | Mateman | H03L 7/0991 327/147 |
| 8,396,179 | B2* | 3/2013 | Van Houdt | H04J 3/0608 375/365 |
| 8,487,669 | B2* | 7/2013 | Hesen | H03K 21/00 327/117 |
| 8,503,964 | B2* | 8/2013 | Herder | H03D 7/165 455/317 |
| 8,548,111 | B2* | 10/2013 | Mateman | H03D 3/006 375/360 |
| 8,638,838 | B1* | 1/2014 | Betts | H04L 7/033 375/295 |
| 8,675,714 | B2* | 3/2014 | Cheung | H04L 25/03878 379/348 |
| 8,692,583 | B2* | 4/2014 | Boomkamp | H03K 5/2418 330/252 |
| 8,712,350 | B2* | 4/2014 | Frambach | H03F 3/211 455/127.1 |
| 8,797,069 | B2* | 8/2014 | Hesen | H03K 21/026 327/117 |
| 8,942,309 | B1* | 1/2015 | Ware | H04L 25/14 375/220 |
| 9,223,736 | B2* | 12/2015 | de Haas | G06F 13/4031 |
| 9,252,802 | B2* | 2/2016 | Hollis | H03M 5/16 |
| 9,379,729 | B2* | 6/2016 | Heliö | G04F 10/105 |
| 9,544,864 | B1* | 1/2017 | Takahashi | H04W 56/0015 |
| 9,720,020 | B2* | 8/2017 | van Dijk | G01R 19/0023 |
| 9,722,822 | B1* | 8/2017 | Zhang | H04L 25/03343 |
| 9,729,345 | B2* | 8/2017 | Shuvalov | H04L 12/403 |
| 9,891,249 | B2* | 2/2018 | van Dijk | G01R 19/0092 |
| 9,935,795 | B2* | 4/2018 | Zhang | H04L 25/03343 |
| 9,973,348 | B2* | 5/2018 | Mounier | G06F 13/4072 |
| 10,313,162 | B1* | 6/2019 | Van Den Hoek | H04B 5/72 |
| 10,554,241 | B2* | 2/2020 | Jain | H04L 12/40013 |
| 10,594,363 | B2* | 3/2020 | Pandey | H04B 3/30 |
| 10,615,996 | B2* | 4/2020 | de Haas | H04L 25/0278 |
| 10,790,873 | B2* | 9/2020 | Pandey | H04B 3/28 |
| 10,791,002 | B2* | 9/2020 | de Haas | H04L 12/40045 |
| 10,892,911 | B2* | 1/2021 | Wojciechowski | H04L 7/0331 |
| 11,038,508 | B2* | 6/2021 | de Haas | H03F 3/26 |
| 11,038,714 | B2* | 6/2021 | Muth | H04L 12/417 |
| 11,061,844 | B2* | 7/2021 | de Haas | G06F 13/4027 |
| 11,088,876 | B1* | 8/2021 | Farjadrad | H04L 25/0298 |
| 11,176,070 | B2* | 11/2021 | de Haas | G06F 13/4282 |
| 11,223,468 | B1* | 1/2022 | Ryu | H04L 27/01 |
| 11,368,330 | B2* | 6/2022 | de Haas | H04L 12/40013 |
| 11,588,662 | B1* | 2/2023 | de Haas | H04L 12/40032 |
| 11,588,663 | B1* | 2/2023 | Muth | H04L 12/40039 |
| 11,627,021 | B2* | 4/2023 | Park | H04L 25/0272 375/286 |
| 11,722,327 | B2* | 8/2023 | Muth | H04L 25/0278 370/438 |
| 11,843,388 | B2* | 12/2023 | Frambach | H04L 12/40006 |
| 12,081,371 | B2* | 9/2024 | Waardenburg | H04L 25/0276 |
| 12,119,964 | B2* | 10/2024 | Ikeda | H04L 25/03878 |
| 2002/0057101 | A1* | 5/2002 | Tang | H04L 25/0286 326/29 |
| 2002/0154701 | A1* | 10/2002 | Ross | H04B 14/04 375/254 |
| 2002/0163393 | A1* | 11/2002 | Heijna | H03L 7/0995 331/57 |
| 2003/0071648 | A1* | 4/2003 | Heijna | G01R 19/04 324/750.3 |
| 2004/0145394 | A1* | 7/2004 | Nedachi | H03K 17/164 327/112 |
| 2006/0050819 | A1* | 3/2006 | Van Houdt | H04J 3/0608 375/354 |
| 2006/0192603 | A1* | 8/2006 | Nguyen | H04L 25/03834 327/172 |
| 2007/0018687 | A1* | 1/2007 | Visser | H04L 25/03878 326/86 |
| 2007/0025492 | A1* | 2/2007 | Canagasaby | H04L 25/0282 375/377 |
| 2007/0200592 | A1* | 8/2007 | Kim | H04L 25/0288 326/30 |
| 2008/0265969 | A1* | 10/2008 | Wolthek | H03F 3/45991 327/332 |
| 2009/0051399 | A1* | 2/2009 | Frambach | H03K 4/502 327/276 |
| 2009/0172242 | A1* | 7/2009 | Piasecki | G06F 13/4208 710/110 |
| 2009/0179666 | A1* | 7/2009 | Chujo | H04L 25/028 326/82 |
| 2009/0190648 | A1* | 7/2009 | Sakano | H04L 25/0278 375/232 |
| 2011/0080237 | A1* | 4/2011 | Fratti | H04L 25/0288 333/28 R |
| 2011/0193595 | A1* | 8/2011 | Fukuda | H04L 25/0272 327/108 |
| 2011/0222623 | A1* | 9/2011 | Hollis | H04L 25/0278 375/295 |
| 2012/0056676 | A1* | 3/2012 | Frambach | H03F 3/193 330/295 |
| 2012/0064847 | A1* | 3/2012 | Xu | H03F 1/3241 455/114.3 |
| 2012/0081156 | A1* | 4/2012 | Hesen | C07F 7/08 327/115 |
| 2012/0081158 | A1* | 4/2012 | Mateman | H03L 7/0991 327/156 |
| 2012/0082280 | A1* | 4/2012 | Mateman | H03L 7/091 375/360 |
| 2012/0119793 | A1* | 5/2012 | Butselaar | H04L 25/028 327/108 |
| 2012/0242377 | A1* | 9/2012 | Yeung | H03F 3/195 327/110 |
| 2013/0002301 | A1* | 1/2013 | Gondi | H03K 19/018557 326/82 |
| 2013/0049845 | A1* | 2/2013 | Boomkamp | H03F 3/4508 327/535 |
| 2013/0099823 | A1* | 4/2013 | Moon | H04L 25/028 326/87 |
| 2013/0101056 | A1* | 4/2013 | Ahn | H03F 3/2171 375/295 |
| 2013/0169457 | A1* | 7/2013 | Helio | H03M 1/12 341/172 |
| 2013/0293272 | A1* | 11/2013 | Hesen | H03K 21/00 327/115 |
| 2013/0294540 | A1* | 11/2013 | Hell | H04L 25/0298 375/295 |
| 2014/0035625 | A1* | 2/2014 | Hafizi | H04L 25/03343 327/108 |
| 2014/0176260 | A1* | 6/2014 | Jeong | H04L 25/03343 333/172 |
| 2014/0330996 | A1* | 11/2014 | de Haas | H04L 12/40032 710/106 |
| 2015/0346239 | A1* | 12/2015 | van Dijk | G01R 15/09 324/115 |
| 2015/0346241 | A1* | 12/2015 | van Dijk | G01R 19/0092 324/123 R |
| 2015/0381150 | A1* | 12/2015 | Momtaz | H03K 19/017545 327/109 |
| 2016/0218753 | A1* | 7/2016 | Fiedler | H03K 19/0005 |
| 2016/0248518 | A1* | 8/2016 | Parikh | H04B 10/58 |
| 2016/0254932 | A1* | 9/2016 | Chong | H04L 25/0288 375/233 |
| 2018/0260353 | A1* | 9/2018 | de Haas | H04L 12/40032 |
| 2019/0058614 | A1* | 2/2019 | de Haas | H04L 12/40032 |
| 2019/0103889 | A1* | 4/2019 | Srivastava | G06F 13/4072 |
| 2019/0199400 | A1* | 6/2019 | Pandey | H04B 3/04 |

(56) References Cited

U.S. PATENT DOCUMENTS

| | | | |
|---|---|---|---|
| 2019/0199401 A1* | 6/2019 | Pandey | H04B 3/28 |
| 2019/0305807 A1* | 10/2019 | LaFevre | H04B 1/0483 |
| 2021/0377060 A1* | 12/2021 | Muth | G06F 13/4072 |
| 2022/0045701 A1* | 2/2022 | Roh | H03K 17/6871 |
| 2022/0075751 A1* | 3/2022 | Farjadrad | H04L 25/028 |
| 2022/0247416 A1* | 8/2022 | Frambach | H04L 12/40169 |
| 2023/0179454 A1* | 6/2023 | Waardenburg | H04L 12/40032 |
| | | | 327/100 |
| 2024/0120956 A1* | 4/2024 | Frambach | G06F 13/4086 |
| 2024/0146353 A1* | 5/2024 | Paul | H04B 1/44 |

\* cited by examiner

TRANSMITTER CIRCUIT

CROSS-REFERENCE TO RELATED APPLICATIONS

This application claims priority under 35 U.S.C. § 119 to European patent application no. 22198853.8, filed Sep. 29, 2022, of which are incorporated by reference herein.

FIELD

The present application relates to a transmitter circuit, and particularly to a transmitter circuit for setting a differential voltage on a Controller Area Network (CAN) bus and also for setting a driver impedance presented to the bus.

BACKGROUND

A Controller Area Network (CAN) bus is a multi-master serial bus that connects one or more nodes in a network. The CAN bus is typically used in automotive and industrial automation applications although it may be applied to other applications. Use of the CAN bus is governed by various ISO standards, for example ISO11898-1 for the CAN protocol, ISO 11898-2 for high speed CAN Physical Layer and ISO 11898-3 for low speed or fault tolerant CAN Physical Layer.

Current CAN buses may be able to support varying data rates, in some cases the range may be between 1 Mbit/s and 10 Mbit/s. However, the support of such data rates is dependent on the network being correctly terminated. In current networks, this termination may comprise, for example a 120Ω termination resistance at the end nodes of the network and intermediate nodes being connected to the bus via stubs of a sufficiently short length. The termination is there to prevent reflections on the bus that may distort or compromise the integrity of the signaling on the bus.

The topology of the CAN bus network may comprise multiple nodes located at varying distances to the terminating impedances at the end nodes. The nodes furthest from the terminating resistors may cause reflection when one of the nodes transmits, which may cause ringing on the bus. This may reduce the maximum data rate at which the bus may operate correctly.

Traditionally other factors, such as the length of the bus cable, limited the data rate to a speed below the speed at which ringing would become an issue. However, advancements in the CAN bus protocol, for example CAN bus flexible data rate (CAN FD), have increased the possible data rate to a point at which ringing becomes influential.

It thus becomes of interest to address the termination resistance and/or the presence of ringing or reflections on the bus.

SUMMARY

According to a first aspect of the present disclosure there is provided a transmitter circuit, comprising:
  a first bus line terminal and a second bus line terminal for coupling to a bus;
  a controller, wherein the controller is configured to provide a transmission data signal for the bus;
  a voltage setting circuit configured to set a differential driver voltage, $V_{DIFF}$, on the bus;
  an impedance setting circuit that has a first leg and a second leg, wherein each leg comprises an adjustable pull-up resistance and an adjustable pull-down resistance connected in series with each other between the supply terminal and the reference terminal, wherein:
    a first-leg-node between the adjustable pull-up resistance and the adjustable pull-down resistance of the first leg is connected to one of the two bus terminals; and
    a second-leg-node between the adjustable pull-up resistance and the adjustable pull-down resistance of the second leg is connected to the other one of the two bus terminals, and
  wherein the controller is configured to set the adjustable resistances of the impedance setting circuit to adjust a driver impedance, $Z_{DRIVE}$, presented to the bus; and
  wherein the controller is configured to detect a transition in the transmission data signal, and in response to a dominant to recessive transition the controller is configured to:
    control the voltage setting circuit such that is sets the differential driver voltage, $V_{DIFF}$, on the bus to a recessive value;
    adjust each of the adjustable pull-up resistances and the adjustable pull-down resistances of the impedance setting circuit with the same target impedance profile such that the transmitter circuit drives the bus with a target driver impedance, $Z_{DRIVE}$, for an active recessive period $T_{ACTREC}$, of a bit time, $T_{Bit}$.

Advantageously, such a transmitter circuit can separate the functionality of setting the voltage on the bus from controlling the impedance presented to the bus. In addition, this can result in a reduction in hardware that is required to implement the transmitter circuit and/or can result in a relaxation in the accuracy of the timing of the control for setting the impedance of the circuit.

In one or more embodiments, in response to the detected dominant to recessive transition, the controller is configured to:
  adjust each of the adjustable pull-up resistances and the adjustable pull-down resistances of the impedance setting circuit with the same target impedance profile such that the transmitter circuit drives the bus with the target driver impedance, $Z_{DRIVE}$, for a predefined subperiod, $T_{ACTREC}$, of a bit time, $T_{Bit}$; and
  adjust the adjustable pull-up resistances and the adjustable pull-down resistances of the impedance setting circuit such that the transmitter circuit drives the bus with a driver impedance, $Z_{DRIVE}$, that is high ohmic for a remaining subperiod of the bit time, $T_{Bit}$.

In one or more embodiments, the voltage setting circuit comprises:
  a first voltage source that is configured to set a first voltage at the first bus line terminal; and
  a second voltage source that is configured to set a second voltage at the second bus line terminal.

In one or more embodiments, the voltage setting circuit comprises:
  a first voltage-setting adjustable resistance connected in series between a supply terminal and the first bus line terminal;
  a second voltage-setting adjustable resistance connected in series between the second bus line terminal and a reference terminal.

In one or more embodiments, the voltage setting circuit further comprises:
  a first diode connected in series with the first voltage-setting adjustable resistance between the supply terminal and the first bus line terminal;

a second diode connected in series with the second voltage-setting adjustable resistance between the second bus line terminal and the reference terminal.

In one or more embodiments, the controller is configured to:
transition the value of the adjustable resistances of the voltage setting circuit from a predetermined value to a high ohmic value in response to the dominant to recessive transition in the transmission data signal in order to set the differential driver voltage, $V_{DIFF}$, on the bus to the recessive value.

In one or more embodiments, the voltage setting circuit comprises:
a first adjustable current source connected in series between a supply terminal and the first bus line terminal;
a second adjustable current source connected in series between the second bus line terminal and a reference terminal.

In one or more embodiments, the voltage setting circuit further comprises:
a first diode connected in series with the first adjustable current source between the supply terminal and the first bus line terminal;
a second diode connected in series with the second adjustable current source between the second bus line terminal and the reference terminal.

In one or more embodiments, the impedance setting circuit further comprises:
a first-leg-first-diode connected in series with the adjustable pull-up resistance of the first leg between: i) the supply terminal; and ii) the first-leg-node;
a first-leg-second-diode connected in series with the adjustable pull-down resistance of the first leg between: i) the first-leg-node; and ii) the reference terminal;
a second-leg-first-diode connected in series with the adjustable pull-up resistance of the first leg between: i) the supply terminal; and ii) the second-leg-node;
a second-leg-second-diode connected in series with the adjustable pull-down resistance of the second leg between: i) the second-leg-node; and ii) the reference terminal.

In one or more embodiments, the controller comprises a shift register that stores a sequence of values that define the target impedance profile, and wherein the controller is configured to:
adjust each of the adjustable pull-up resistances and the adjustable pull-down resistances of the impedance setting circuit according to the sequence of values that are stored in the shift register in response to the dominant to recessive transition.

In one or more embodiments, the target impedance profile comprises a first resistance transition and a second resistance transition, wherein:
the first resistance transition represents a transition from a high ohmic value to a predetermined resistance value at the start of the predefined subperiod, $T_{ACTREC}$, of the bit time, $T_{Bit}$; and
the second resistance transition represents a transition from the predetermined resistance value to the high ohmic value at the end of the predefined subperiod, $T_{ACTREC}$, of the bit time, $T_{Bit}$.

In one or more embodiments, the controller is configured to maintain the adjustable pull-up resistances and the adjustable pull-down resistances of the impedance setting circuit at the high ohmic value for the remaining subperiod of the bit time, $T_{Bit}$.

There is also disclosed a CAN network comprising one or more of any of the transmitter circuits disclosed herein.

There is also disclosed a vehicle comprising any CAN network or any transmitter circuit disclosed herein.

According to a first aspect of the present disclosure there is provided a method of operating a transmitter circuit, wherein the transmitter circuit comprises:
a first bus line terminal and a second bus line terminal for coupling to a bus;
an impedance setting circuit that has a first leg and a second leg, wherein each leg comprises an adjustable pull-up resistance and an adjustable pull-down resistance connected in series with each other between the supply terminal and the reference terminal, wherein:
a first-leg-node between the adjustable pull-up resistance and the adjustable pull-down resistance of the first leg is connected to one of the two bus terminals; and
a second-leg-node between the adjustable pull-up resistance and the adjustable pull-down resistance of the second leg is connected to the other one of the two bus terminals,
wherein the method comprises detecting a transition in a transmission data signal, and in response to a dominant to recessive transition in the transmission data signal:
setting a differential driver voltage, $V_{DIFF}$, on the bus to a recessive value;
adjusting each of the adjustable pull-up resistances and the adjustable pull-down resistances of the impedance setting circuit with the same target impedance profile such that the transmitter circuit drives the bus with a target driver impedance, $Z_{DRIVE}$, for an active recessive period $T_{ACTREC}$, of a bit time, $T_{Bit}$.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
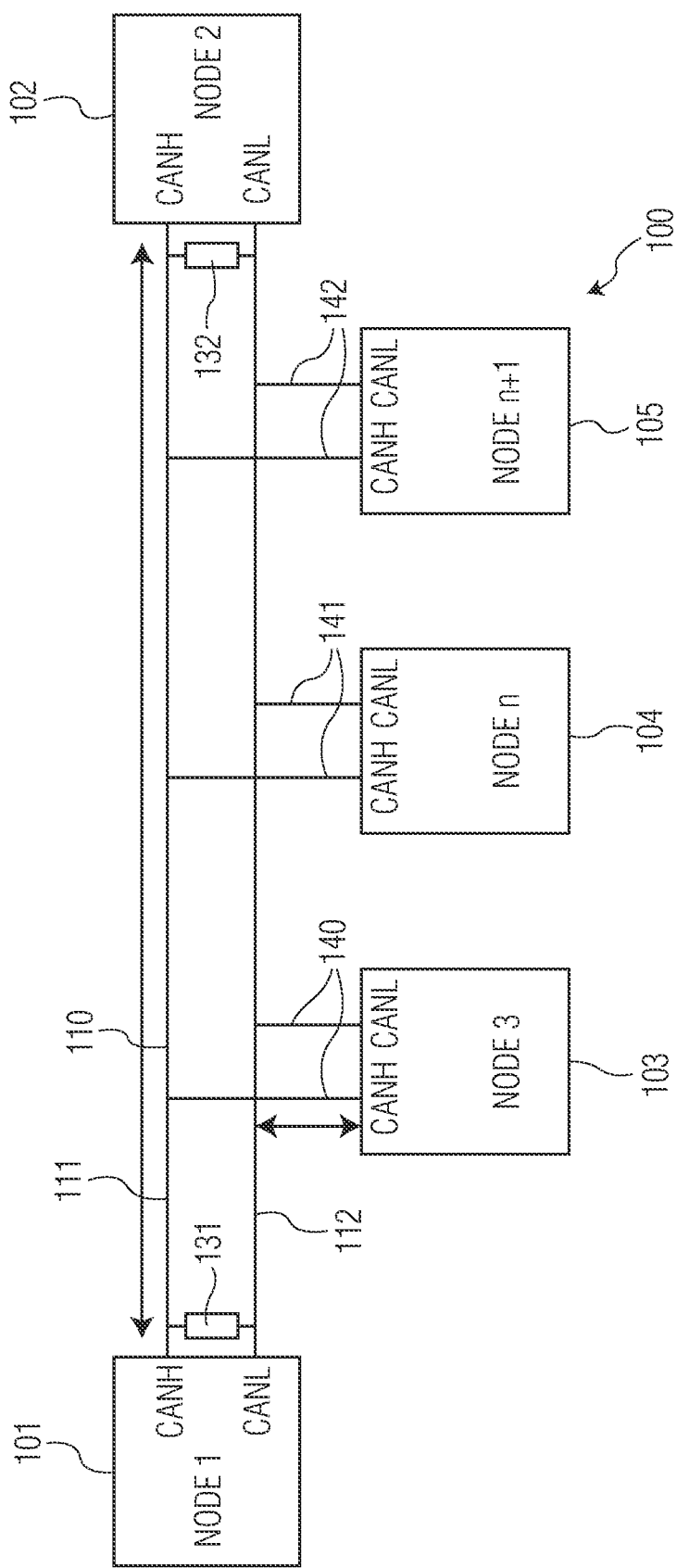
FIG. 1 schematically illustrates a block diagram of an example of a CAN bus network with multiple nodes according to an example of the present invention.

FIG. 1 shows an illustrative example of a network 100 comprising a plurality of nodes coupled together via a CAN (Controller Area Network) bus according to an example of the present application.

The network 100 comprises a plurality of nodes exemplified by a first node 101, a second node 102, a third node 103, an (n-1)$^{th}$ node 104 and an n$^{th}$ node 105. The nodes 101 to 105 are coupled together for communication by a bus 110. Herein the bus is exemplified as a CAN bus 110, implemented in the form of a two-wire bus comprising a CANH wire 111 and a CANL wire 112. In this case, the wires 111 and 112 form a single twisted-pair cable having a nominal cable impedance. Each of the nodes 101 to 105 is coupled to the CANH 111 and CANL 112 wires via tap lines.

In this example the nominal cable impedance is 120Ω, which is typical of some automotive applications of the CAN bus. It will however be appreciated that embodiments are applicable to other line impedances and the present application should not be understood to be limited to a specific nominal cable impedance. It will also be appreciated that the exact impedance of the line may be affected by physical factors such as the cable and/or isolation material. While line impedance is assumed to be 120Ω, the actual line impedance may vary around this value and can be considered to be approximately 120Ω. Similarly, termination resistors may vary as to their exact value due to real-world implementations.

The first node 101 is a first end node of the bus 110 and has a termination resistance $R_{Term}$ 131 corresponding to the nominal cable impedance such as 120Ω. It will be appreciated that 120Ω is in accordance with this example of cable impedance. The second node 102 is a second end node and has a termination resistance $R_{Term}$ 132 corresponding to the nominal cable impedance such as 120Ω. The third, (n-1)$^{th}$ node and n$^{th}$ node are intermediate nodes and are coupled to the CAN bus 110 via stubs or tap lines 140, 141 and 142. Such intermediate nodes may be unterminated or optionally applied with a high ohmic termination in the kilo-Ohms range in some systems. In some examples, high ohmic termination may provide limited ringing suppression at these quasi open ends of the cable, but the effectiveness is very limited due to the deviation from the nominal cable impedance.

Each of the nodes may be coupled to further circuitry, such as sensors or microcontrollers, that may be configured to communicate with one or more of the other nodes using the CAN bus 110.

Figure 2:
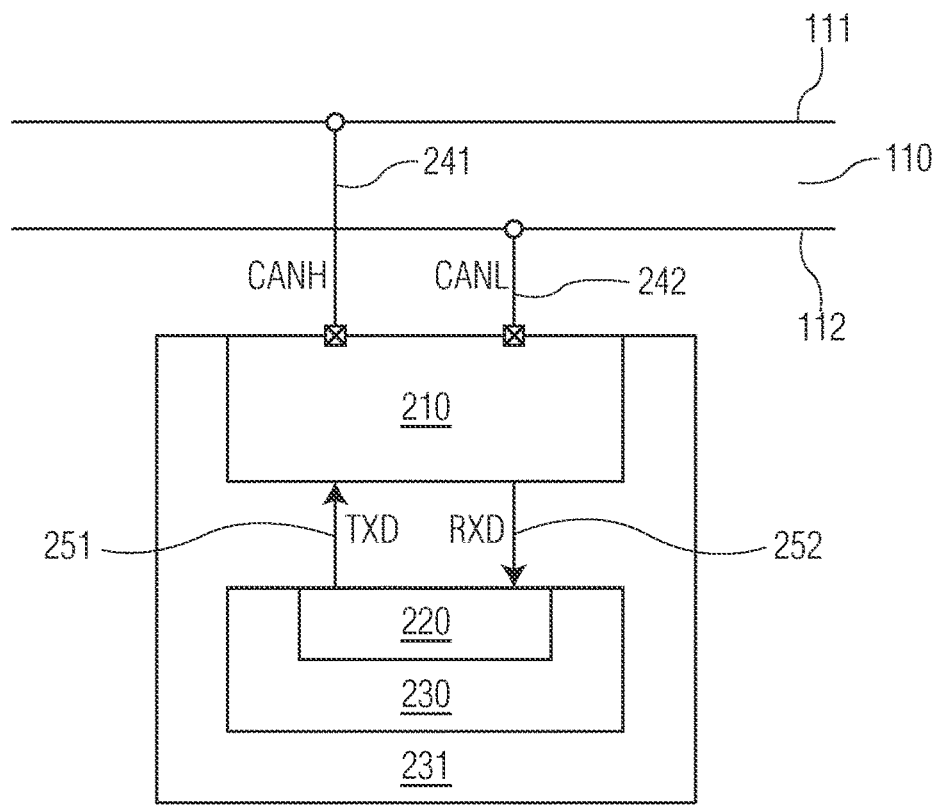
FIG. 2 schematically illustrates a block diagram of a network node according to an example of the present invention.

FIG. 2 illustrates a block diagram of an example of a node 201, for example one of the nodes 101 to 105 in more detail. Node 201 is coupled to the CAN bus 110 with a stub line 241 coupled to the CANH wire 111 and a stub line 242 coupled to the CANL wire 112. The stub lines 241, 242 are coupled to a CAN bus transceiver 210 of the node 201. It will be appreciated, that in the case where stubs are not needed, for example for an end node, the CAN bus transceiver will be coupled directly to the wires 111 and 112.

The CAN bus transceiver 210 is coupled to a CAN controller 220 via a transmit data connection (TXD) 251 and a receive data connection (RXD) 252.

The CAN controller 220 may form part of a microcontroller 230 of the node 201.

The microcontroller 230 may determine messages that are to be transmitted on the bus and provide these to the CAN controller 220. The microprocessor may receive messages from the bus from the CAN controller 220 and interpret them. The microcontroller 230 may be further connected to other entities, such as sensors or actuators and provide an interface between them and the CAN bus 110.

The CAN controller 220 may receive bits from the CAN bus 110 (via the bus transceiver 210) and reconstruct the bits into a message to be interpreted by the microcontroller 230. The CAN controller 220 may receive a message from the microcontroller 230 and provide it as serial bits to the bus via the CAN transceiver 210.

The CAN transceiver 210 may convert the digital data bits on the TXD connection 251 from the CAN controller 220 into analogue bus signals. The CAN transceiver 210 may further convert the analogue bus signals into digital bits to be provided via the RXD connection 252 to the CAN controller 220.

The implementation of the network 100 may be governed by certain parameters in order to reduce ringing and protect the integrity of the signalled data at higher data rates. For example, the CAN bus 110 may have a maximum length at which maximum data rates may be achieved. In another example, the stubs 140, 141 and 142 connecting the intermediate nodes 101 to 105 to the CAN bus 110 may be kept as short as possible to reduce reflections. In one case, the maximum length of the CAN bus may be restricted to 40 m and the stubs to less than 0.3 m, however it will be appreciated that this is by way of example.

Despite this requirement, the length of the bus and the stubs may be subject to other factors. For example, in an automotive application the implementation of the CAN bus network may be governed by the shape and size of a vehicle and position of the nodes. It may not always be possible to have stubs that are as short as desired. Furthermore, even in the case of the stubs being as short as is practical, ringing may still occur at higher data rates.

The ringing in the unterminated stub lines may corrupt the communication on the bus. This becomes more of a problem with new protocols, for example CAN FD, where the data rate is higher. One way to address ringing is to redesign network topology in order to improve termination, however this is time consuming and costly.

Embodiments of the present application provide a method of suppressing ringing that may be implemented on existing network topologies. Furthermore, embodiments may take into account the speed at which this suppression is implemented and mitigate the potential of glitches occurring in ringing suppression circuits.

The maximum bus length can be determined by, or rather can be a trade-off with, the selected signalling rate. A signalling rate decreases as transmission distance increases. While steady-state losses may become a factor at the longest transmission distances, the major factors limiting signalling rate as distance is increased are time varying. Cable bandwidth limitations, which degrade the signal transition time and introduce inter-symbol interference (ISI), are primary factors reducing the achievable signalling rate when transmission distance is increased. For a CAN bus, the signalling rate is also determined from the total system delay—down and back between the two most distant nodes of a system and the sum of the delays into and out of the nodes on a bus with the typical e.g. 5 ns/m propagation delay of a twisted-pair cable. Also, consideration must be given to the signal amplitude loss due to impedance of the cable and the input impedance of the transceivers. Under strict analysis, skin effects, proximity to other circuitry, dielectric loss, and radiation loss effects all act to influence the primary line parameters and degrade the signal.

Since stub-lines are unterminated, signal reflections can develop in a stub that drive signal levels back and forth across a receiver's input thresholds, creating errors. Bit-sampling occurs near the end of a bit, so it is mandatory that all signal reflections in a CAN stub-line be attenuated before or during the propagation delay segment to provide an adequate margin of safety. To minimize reflections, stub-line length should not exceed one-third (⅓) of the line's critical length. Beyond this stub-length, many variables come into play since the stub can no longer considered to be a lumped parameter. This is the maximum length that a stub remains invisible to a transmission line. The critical length of a bus line occurs at the point where the down-and-back propagation delay of a signal through a line equals the transition time of a signal (the greater of the rise or fall times). For instance, a typical CAN driver may have a 50 ns transition time, and when considering a typical twisted-pair transmission line propagation delay of 5 ns/m, the down-and-back delay for one meter becomes 10 ns/m. The critical length becomes 5 m (50 ns/10 ns/m=5 m), and the maximum un-terminated stub length for the network is ⅓ of the critical length, or 1⅔ m (≈1.67 m).

Those skilled in the art immediately understand that existing network topologies developed for a (lower) target data transmission rate over the network may not be maintained in case the transmission rate is increased unless further measures are taken to suppress signal disturbances and to improve the signal quality.

Figure 3:
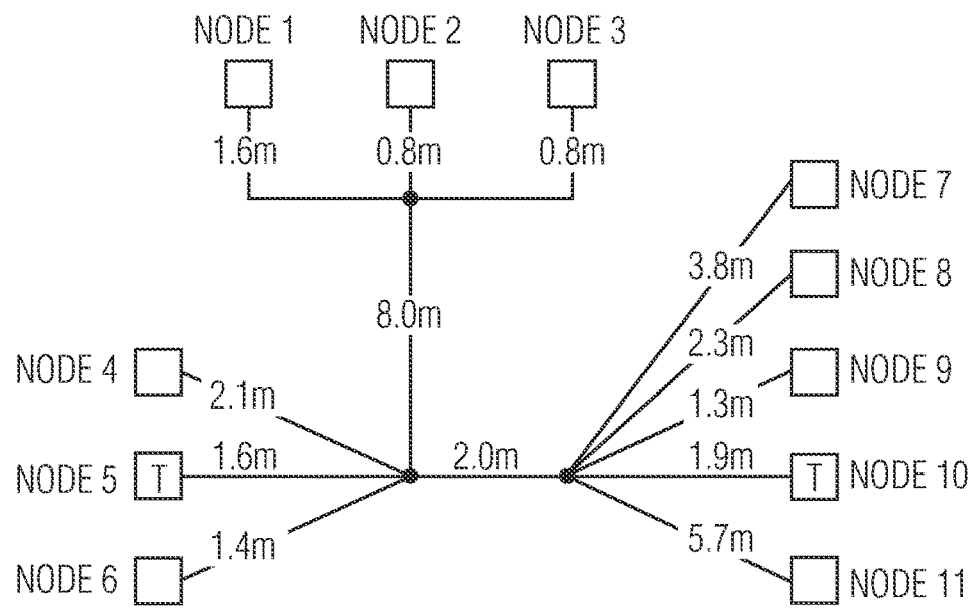
FIG. 3 schematically illustrates a block diagram of an example of a CAN bus network with multiple nodes according to another example of the present invention.

FIG. 3 illustrates a block diagram of an exemplary real case scenario of a network comprising a plurality of nodes coupled together via a CAN bus. The network comprises node 1 to node 11, illustrating in general multiple nodes, coupled together for communication via the CAN bus. The CAN bus and the stubs are shown as solid lines, which are each indicative of a single twisted-pair cable. The node 5 and the node 10 should be considered to form the respective end nodes of the CAN bus. Each of the node 5 and node 10 has a termination resistance $R_{Term}$ "T" according to the nominal cable impedance such as 120Ω.

When for instance one of the nodes 1, 2, 3, 4, 7, 8 or 11 that are further away from the termination resistors at the nodes 5 and 10 (exemplary stub lengths are indicated in FIG. 3) starts sending data, reflections in the network will cause signal disturbances. A CAN FD controller samples the bus for instance typically at 70% of bit time. If the duration of the signal disturbance is longer than the typical sampling time, erroneous bit information may be captured, which results in a corrupted data message. By using a longer bit time, this problem of signal disturbance may be avoided but it results in effectively limiting the maximum data transmission rate of the network. Reflections due to too long stubs are a major transmission rate limiting factor when using network topologies developed for classical CAN protocol at a transmission rate of e.g. 500 kb/s also for the more recent CAN FD protocol, which specifies transmission rates from 1 Mbit/s to 5 Mbit/s or even higher.

Further, it should be considered that even with a well-terminated network, there may be a further major transmission rate limiting factor due to a high capacitance bus loading. In the case of a high number of nodes connected to the CAN bus network, the dominant to recessive transition becomes very slow. In recessive state the transmitter is high ohmic. When each connected node adds a capacitance (of, for instance, a maximum of 100 pF) to the CAN bus and the CAN bus impedance is fixed at 60Ω, the dominant to recessive transition will never be faster than approximately 100 ns in the case of a network to which ten nodes are connected. If the network is desired to have a transmission rate of 5 Mbit/s or higher, the bit time must be 200 ns or shorter.

Figure 4:
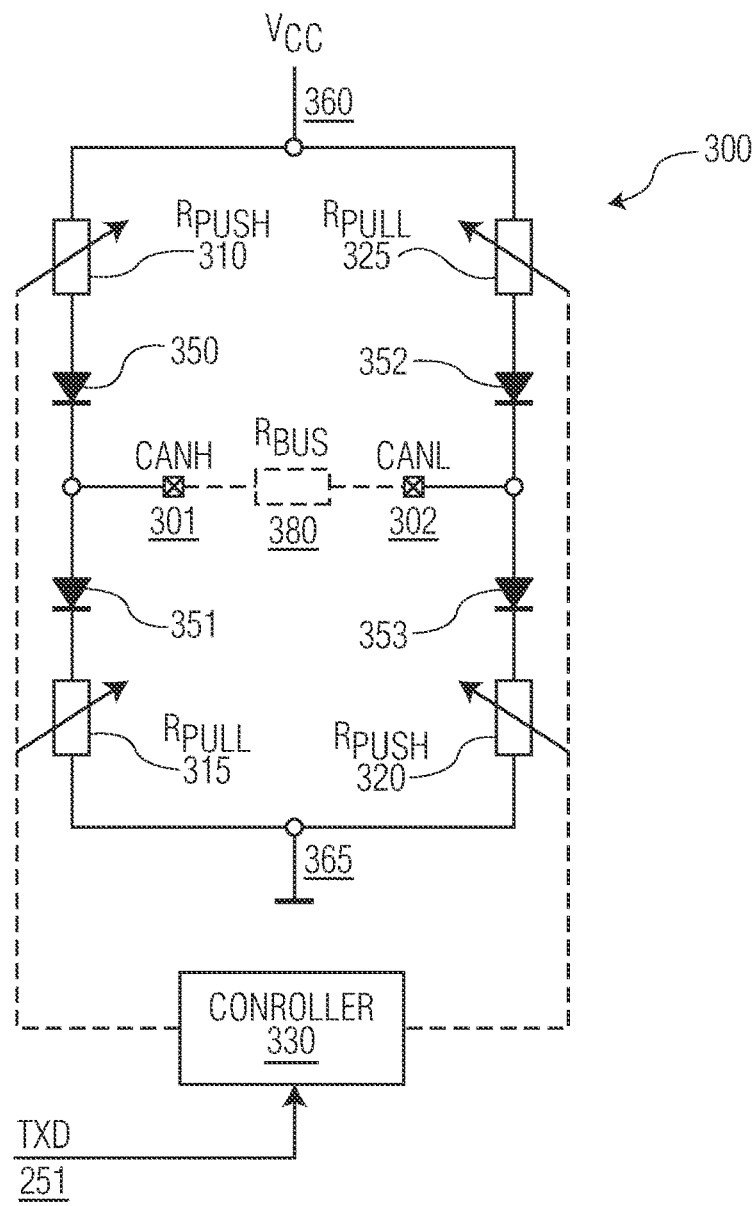
FIG. 4 schematically illustrates a block diagram of a bus transceiver circuit with ringing suppression.

Referring now to FIG. 4, a block diagram of a bus transceiver circuit is schematically illustrated. The circuit 300 forms an impedance bridge coupling to CANH and CANL terminals 301, 302, which in turn are coupled to the CANH stub line 241 and the CANL stub line 242, respectively, and further to the CANH wire 111 and CANL wire 112 (cf. the embodiment shown in FIG. 2). The bridge comprises a first leg, which is also referred to as CANH (side) leg, and a second leg, which is also referred to as CANL (side) leg. Each leg comprises two controllable impedances, which impedance properties are dynamically adjustable for instance by an edge detector 330. The CANH leg comprises a push resistor $R_{PUSH}$ 310, which is connected between a common voltage supply rail $V_{CC}$ 360 (which is an example of a supply terminal) and the CANH terminal 301, and a pull resistor $R_{PULL}$ 315, which is connected between the CANH terminal 301 and a common ground rail 365 (which is an example of a reference terminal). The CANL leg comprises a pull resistor $R_{PULL}$ 325, which is connected between the common voltage supply rail $V_{CC}$ 360 and the CANL terminal 302, and a push resistor $R_{PUSH}$ 320, which is connected between the CANL terminal 302 and the common ground rail 365. The legs may be understood to have a symmetrical resistor configuration with respect to the CANH and CANL terminals 301 and 302.

The CAN bus has a load impedance represented by the equivalent bus impedance $R_{BUS}$ 380. Typically, the bus impedance $R_{BUS}$ 380 has an impedance of approximately 60Ω in accordance with the above described typical nominal cable impedance of 120Ω provided that the CAN bus is terminated with termination resistance $R_{Term}$=120Ω at each end.

Further, diodes 350 to 353 are connected in series with each of the resistors 310 to 325 in order to prevent reverse currents flowing from the CAN bus into the common voltage supply rail 360 and the common ground rail 365 in case of a bus voltage higher than a supply voltage potential $V_{CC}$ on the common voltage supply rail 360 or lower than a ground potential on the common ground rail 365.

Figure 5:
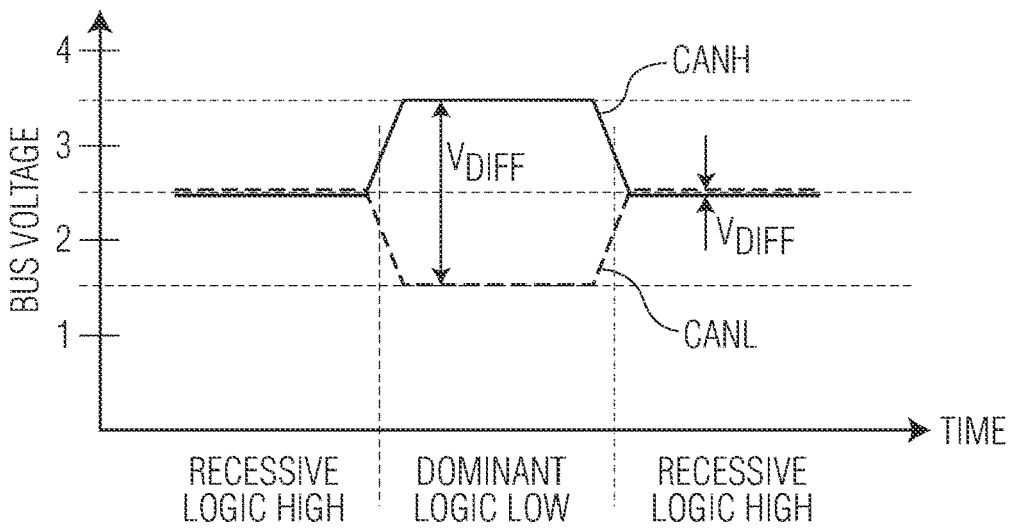
FIG. 5 schematically illustrated an idealized differential waveform.

FIG. 5 shows a schematic illustration of an idealized differential waveform. The waveform is representative of for instance an idealized CAN bus signal resulting from a transmitting transceiver operating with a power supply rail of $V_{CC}$ equal to 5 volts and ground. An active transceiver drives the waveform to a "dominant" state representing a logic low level (logic zero). Bus transceivers are biased at approximately $V_{CC}/2$ such that the differential waveform peaks on the CANH wire 111 and the CANL wire 112 avoid distortion by not approaching the supply voltage rails. A CAN bus logic high "recessive" level results when transceiver drivers are inactivated and such that their respective differential output voltages are removed from the bus.

Returning to FIG. 4, the impedance properties of the two push resistors $R_{PUSH}$ 310 and 320 and the two pull resistors $R_{PULL}$ 315 and 325 are dynamically adjustable for instance by the edge detector 330, an input of which is coupled to the transmit data connection (TXD) 251. The edge detector 300 is configured to apply common control characteristics for the two push resistors $R_{PUSH}$ 310 and 320 and the edge detector 300 is further configured to apply common characteristics for the two pull resistors $R_{PULL}$ 315 and 325. The same control characteristics should be understood herein in that the respective two resistors have the same impedance property being a function of a set of parameters.

The impedance values of the push resistors $R_{PUSH}$ 310 and 320 and the pull resistors $R_{PULL}$ 315 and 325 are dynamically adjustable based on two parameters x and y. The domain of the parameter x may comprise the value range x=(0, 1), where x=(0, 1)={x ∈ R, 0<x<1}, and the domain of the parameter y may comprise the value range y=(0, 2], where y=(0, 2]={y ∈ R, 0<y≤2}. The parameters x and y are independent of each other. The push impedance value $R_{PUSH}$ of the push resistors $R_{PUSH}$ 310 and 320 are adjustable as following:

$$R_{PUSH} = \frac{R_{DOM}}{x \cdot y}$$

The pull impedance value $R_{PULL}$ of the pull resistors $R_{PULL}$ 315 and 325 are adjustable as following:

$$R_{PULL} = \frac{R_{DOM}}{(1-x) \cdot y}$$

The driver impedance $Z_{DRIVE}$ of the transmitter circuit 300 results in $$Z_{DRIVE} = 2 \cdot \frac{1}{\frac{1}{R_{PUSH}} + \frac{1}{R_{PULL}}} = 2 \cdot \frac{1}{\frac{x \cdot y}{R_{DOM}} + \frac{(1-x) \cdot y}{R_{DOM}}} = 2 \cdot \frac{1}{\frac{y}{R_{DOM}}} = 2 \cdot \frac{R_{DOM}}{y}$$

which is a function on the parameter y.

This means that the driver impedance $Z_{DRIVE}$ of the transmitter circuit 300 can be dynamically adjusted to any impedance value between a low ohmic state, which is herein determined by a lowest driver impedance value $Z_{DRIVE}=R_{DOM}$, and a high ohmic state, which is herein represented by $Z_{DRIVE}=\infty$. $R_{DOM}$ is the minimum drive impedance value of the transmitter circuit 300. For instance, the minimum drive impedance value may be $R_{DOM}=15\Omega$. It should be noted that the high ohmic state, referred herein by $Z_{DRIVE}=\infty$, may comprise a maximum drive impedance value in the range of kilo Ohms or mega Ohms.

The differential driver voltage $V_{DIFF}$, which is the potential difference between the voltages driven on CANH wire 111 and the CANL wire 112 ($V_{CANH}-V_{CANL}$) is also dynamically adjustable:

$$V_{DIFF} = \frac{R_{BUS}}{R_{BUS} + \frac{2 \cdot R_{DOM}}{y}} \cdot (2x-1) \cdot (V_{CC} - 2 \cdot \Delta V_{Diode}) =$$

$$\frac{R_{BUS}}{R_{BUS} + Z_{DRIVE}} \cdot (2x-1) \cdot (V_{CC} - 2 \cdot \Delta V_{Diode})$$

which is a function of the parameter x and the driver impedance value $Z_{DRIVE}$. $\Delta V_{Diode}$ is the voltage drop of the diodes 350-353 connected in series with the push resistors $R_{PUSH}$ 310, 320 and the pull resistors $R_{PULL}$ 315, 325, respectively. $V_{CC}$ is the supply voltage potential provided at the common voltage supply rail 360 (with respect to the voltage potential of the ground rail 365). $R_{BUS}$ is the equivalent bus impedance, e.g. $R_{BUS}=60\Omega$. At a given driver impedance value $Z_{DRIVE}$, the differential driver voltage $V_{DIFF}$ can be adjusted between $V_{min}$ $$V_{min} = V_{DIFF}(x=0) = -\frac{R_{BUS}}{R_{BUS} + Z_{DRIVE}} \cdot (V_{CC} - 2 \cdot \Delta V_{Diode}) = -V_{limit}$$

and $V_{max}$ $$V_{max} = V_{DIFF}(x=1) = \frac{R_{BUS}}{R_{BUS} + Z_{DRIVE}} \cdot (V_{CC} - 2 \cdot \Delta V_{Diode}) = V_{limit}$$

It should be noted that the minimum differential driver voltage $V_{min}$ and the maximum differential driver voltage $V_{max}$ are functions of the driver impedance value $Z_{DRIVE}$, i.e. $V_{min}=V_{min}(Z_{DRIVE})$ and $V_{max}=V_{max}(Z_{DRIVE})$. For instance, assume that the driver impedance $Z_{DRIVE}$ (e.g. $Z_{DRIVE}=120\Omega$) substantially corresponds to the termination resistance $R_{Term}$ (e.g. $R_{Term}=120\Omega$), which means that equivalent bus impedance $R_{BUS}=\frac{1}{2} Z_{DRIVE}$ (e.g. $R_{BUS}=60\Omega$). Hence, the maximum differential driver voltage $V_{max}$ results in $$V_{max} = \frac{1}{3} \cdot (V_{CC} - 2 \cdot \Delta V_{Diode})$$

Further, the voltage potential $V_{CC}$ may be $V_{CC}=5$ V and the voltage drop $\Delta V_{Diode}$ of the diodes 350-353 may be $\Delta V_{Diode}=1$ V (a typical voltage drop $\Delta V_{Diode}$ of a diode is in the range of 0.5 V to 1 V). The maximum differential driver voltage $V_{max}$ results in $V_{max}=1$ V. In order to drive a differential driver voltage $V_{DIFF}$, the driver impedance $Z_{DRIVE}$ has to be adjusted to a lower impedance value.

More generally, the differential driver voltage $V_{DIFF}$, which is the potential difference between the voltages driven on the CANH wire 111 and the CANL wire 112 ($V_{CANH}-V_{CANL}$), is dynamically adjustable $$V_{DIFF} = \frac{R_{BUS}}{R_{BUS} + \frac{2 \cdot R_{DOM}}{y}} \cdot (2x-1) \cdot V_{CC\_eff} = \frac{R_{BUS}}{R_{BUS} + Z_{DRIVE}} \cdot (2x-1) \cdot V_{CC\_eff}$$

where $V_{CC\_eff}$ relates to an effective supply voltage available to the voltage dividing push and pull resistors or each leg. In the example shown in FIG. 4, the effective supply voltage is determined by the voltage potential difference between the voltage supply rail 360 and the ground rail 365 and the voltage drop $\Delta V_{Diode}$ due to the diodes connected in series with the push resistors 310, 320 and pull resistors 315, 325:

$$V_{CC\_eff} = V_{CC} - 2 \cdot \Delta V_{Diode}$$

Those skilled in the art will understand that the legs may comprise further components, which may have to be considered in the effective supply voltage $V_{CC\_eff}$.

When the bus is in a passive recessive state, the impedance on the bus is determined by the termination resistance in the network. The equivalent bus impedance is for instance $R_{BUS}=60\Omega$, which corresponds to the termination resistance $R_{Term}=120\Omega$. When the bus is in an active recessive state or a dominant state, the impedance of the bus is determined by the dynamically adjustable driver impedance value $Z_{DRIVE}=Z_{DRIVE}$ (y) of the transmitter circuit 300, which is a function of the parameter y.

Examples of the transmitter can be adjusted to different impedance states (wherein for the sake of explanation only it should be assumed that the lowest driver impedance value $R_{DOM}=15\Omega$, the voltage drop of the diodes $\Delta V_{Diode}=1$ V, $V_{CC}=5$ V is supplied to the voltage supply rail, the termination resistance is $R_{Term}=120\Omega$, and the equivalent bus impedance is $R_{BUS}=60\Omega$):

CAN transmitter dominant with $V_{DIFF}=2$ V:

$$x = 1, y = 1 = > R_{PUSH} = 15\Omega(= R_{DOM}), R_{PULL} = \infty\Omega(\text{high ohmic})$$

$$= > Z_{DRIVE} = 30\Omega, V_{DIFF} = 2 \text{ V}$$

CAN transmitter (passive) recessive with $Z_{DRIVE}=\infty\Omega$ and $V_{DIFF}=0$ V:

$$x = 1, y = 0 = > R_{PUSH} = \infty\Omega(\text{high ohmic}),$$

$$R_{PULL} = \infty\Omega(\text{high ohmic})$$

$$= > Z_{DRIVE} = \infty\Omega, V_{DIFF} = 0 \text{ V}$$

CAN transmitter active recessive with $Z_{DRIVE}=120\Omega$ and $V_{DIFF}=0$ V:

$$x = 0.5, y = 0.25 = > R_{PUSH} = 120\Omega(= R_{Term}),$$

$$R_{PULL} = 120\Omega(= R_{Term})$$

$$= > Z_{DRIVE} = 120\Omega, V_{DIFF} = 0 \text{ V}$$

CAN transmitter active recessive with $Z_{DRIVE}=15\Omega$ and $V_{DIFF}=0$V:

$$x = 0.5, y = 2 = > R_{PUSH} = 15\Omega(= R_{DOM}), R_{PULL} = 15\Omega(= R_{DOM})$$

$$= > Z_{DRIVE} = 15\Omega\Omega, V_{DIFF} = 0 \text{ V}$$

CAN transmitter negative active recessive with dominant in opposite phase, $V_{DIFF}=-2$ V:

$$x = 0, y = 1 = > R_{PUSH} = \infty\Omega(\text{high ohmic}), R_{PULL} = 15\Omega(= R_{DOM})$$

$$= > Z_{DRIVE} = 30\Omega, V_{DIFF} = -2 \text{ V}$$

The above examples illustrate that the transmitter circuit 300 of FIG. 4 allows for adjusting the differential driver voltage $V_{DIFF}$ and driver impedance $Z_{DRIVE}$ based on the parameters x and y, which define the impedance properties $R_{PUSH}$ of the push resistors 310 and 320 and the impedance properties $R_{PULL}$ of the pull resistors 315 and 325. The above examples illustrate a use of the transmitter circuit 300 for a static adjustment of a predefined differential driver voltage $V_{DIFF}$ with a predefined driver impedance $Z_{DRIVE}$ during a predefined bus state. However, the properties of the transmitter circuit 300 may be also dynamically adjusted for instance during a transition phase such as a dominant (DOM) to recessive state (REC) transition in order to improve the signal quality and in particular to suppress or prevent ringing.

Ringing can be prevented or suppressed in that an adequate or low impedance is used to drive the CAN bus during state transitions. For transitions from a recessive state to a dominant state, the driver impedance of the transmitter is low ohmic (e.g. about ~30Ω) to be able to drive a dominant voltage on the CAN bus. For transitions from a dominant state to a recessive state, the drive impedance of the transmitter is high ohmic in a classical CAN transmitter.

Figure 6:
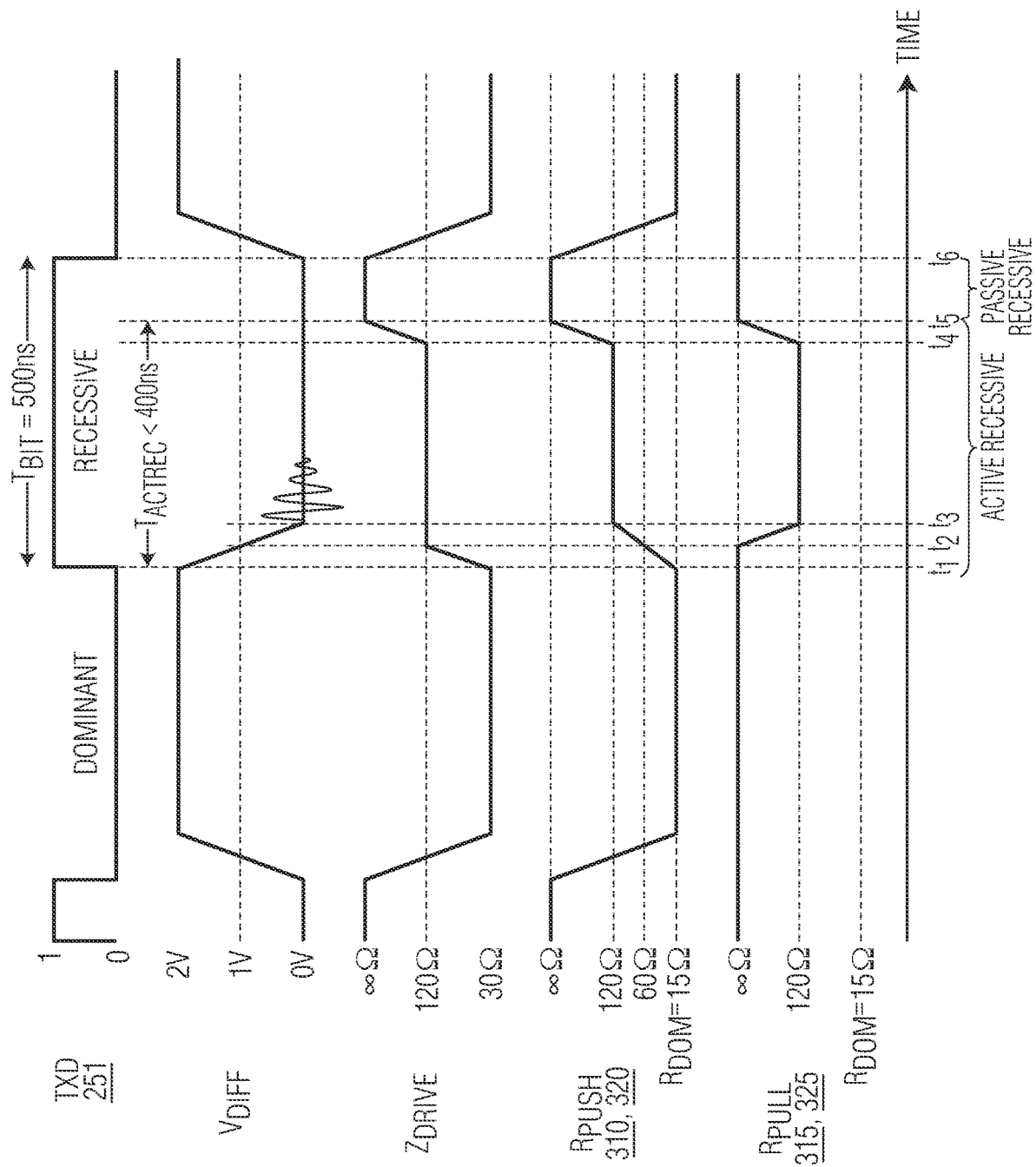
FIG. 6 schematically illustrates a signaling diagram showing an example operation of the bus transceiver circuit of FIG. 4.
Figure 7:
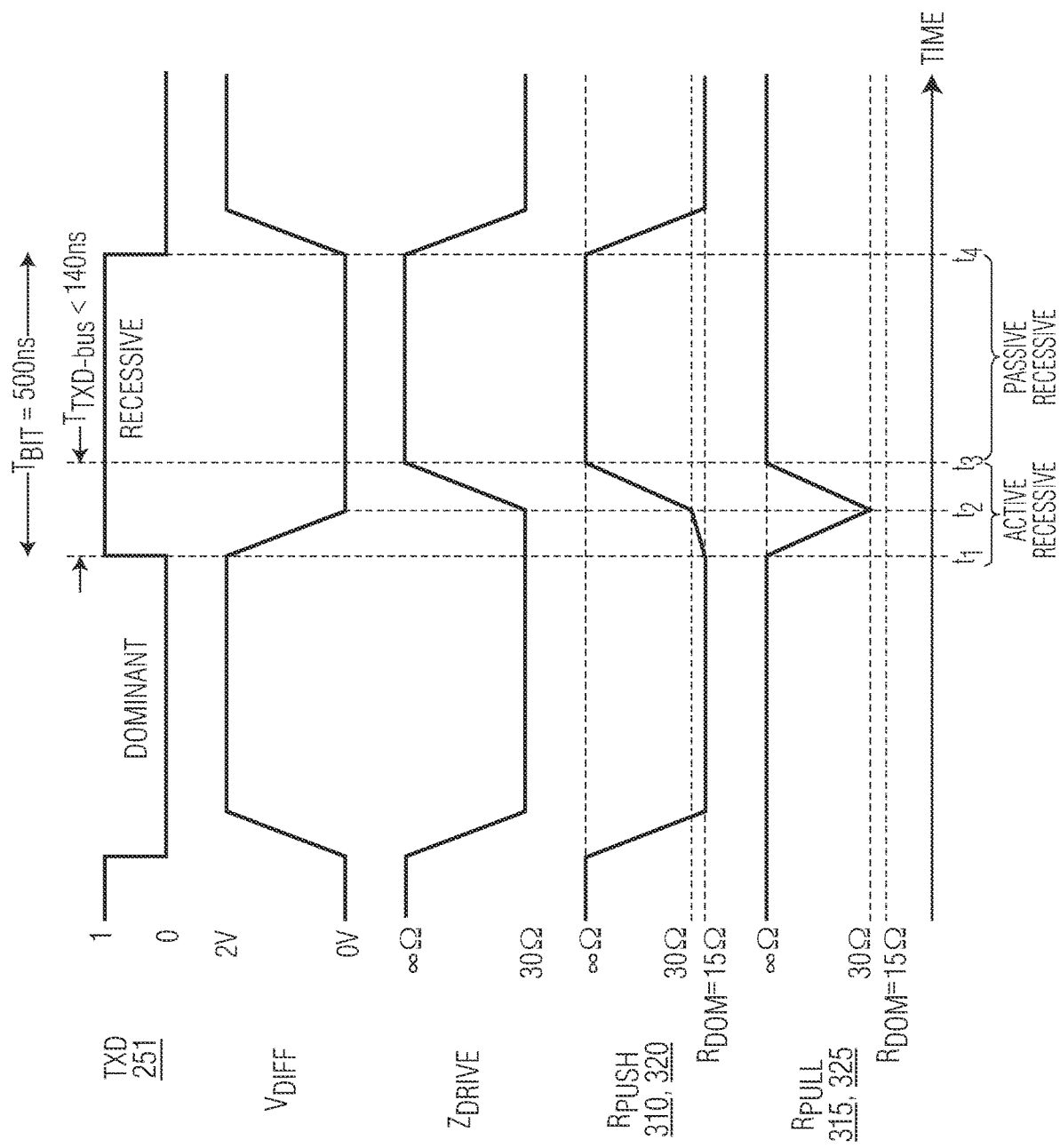
FIG. 7 schematically illustrates a signaling diagram showing an example operation of a bus transceiver circuit according to yet another example of the present invention.

Referring now to FIG. 6, a signalling diagram showing the operation of the bus transceiver circuit of FIG. 4 is schematically illustrated. In this example, the time taken to transmit a bit is bit time $T_{Bit}=500$ ns. It will be appreciated that the time $T_{Bit}$ taken to transmit a bit corresponds to the data rate of the CAN bus. In this case the bit time $t_{Bit}=500$ ns corresponding to a data bit rate of 2 Mbits/s, however the data rate may change with the operation of the CAN bus. It will be appreciated that when the data rate changes, for example due to a change in operation mode, the bit time $T_{Bit}=500$ ns and all further related time periods will change accordingly. For the sake of explanation only it should further be assumed that the lowest driver impedance value $R_{DOM}=15\Omega$, the voltage drop of the diodes $\Delta V_{Diode}=1$ V, $V_{CC}=5$ V is supplied to the voltage supply rail, the termination resistance is $R_{Term}=120\Omega$, and the equivalent bus impedance is $R_{BUS}=60\Omega$.

In particular, FIG. 6 illustrates a signalling timing diagram in which the transmitter drives the bus with 120Ω for 400 ns after the dominant to recessive transition. In this example the transmitter impedance of 120Ω is chosen merely as an example. Similarly, for the duration of the active recessive period, $T_{ACTREC}$, this is chosen to be 400 ns or less for the bit time $T_{Bit}=500$ ns, but the active recessive period $T_{ACTREC}$ may also be another value.

In operation, the CAN bus controller 220 provides a serial bit stream to the CAN transceiver 210 for transmission on the bus. The edge detector 330 monitors edges on this bit stream. At time $t_1$, the signal on TXD 251 transitions from low to high, which will cause a dominant to recessive transition of the differential driver voltage $V_{DIFF}$ on the CAN bus 110. It will be appreciated that the low to high transition of TXD 251 will not immediately cause a change on the CAN bus because there is a delay as the signal 251 is received by the CAN transceiver 210 and converted to a bus level for the CAN bus 110.

In the dominant state, the push resistors 310 and 320 are controlled to stay at $R_{PUSH}=R_{DOM}=15\Omega$ and the pull resistors 315 and 325 are controlled to stay high ohmic, which results in a low ohmic driver impedance $Z_{DRIVE}=30\Omega$.

In response to the detection of the dominant to recessive transition at time $t_1$, the driver impedance $Z_{DRIVE}$ is adjusted from the starting driver impedance $Z_{DRIVE}=30\Omega$, representing the low ohmic driver impedance during $Z_{DRIVE}$ during dominant state, to a target driver impedance $Z_{DRIVE}=120\Omega$; the adjustment is preferably performed continuously over time and more preferably at a constant change rate. The driver impedance $Z_{DRIVE}$ is adjusted by controlling the push resistors 310 and 320 to increase their impedances from the starting push impedance $R_{PUSH}=15\Omega$ to the target push impedance $R_{PUSH}=120\Omega$, the adjustment is preferably performed continuously over time and more preferably at a constant change rate. The pull resistors 315 and 325 are controlled to stay high ohmic ($R_{PULL}=\infty\Omega$).

In response to the adjustment of the driver impedance $Z_{DRIVE}$, the differential driver voltage $V_{DIFF}$ on the CAN bus is adjusted from a dominant differential voltage (e.g. $V_{DIFF}\approx 2$ V) to a recessive differential voltage (e.g. $V_{DIFF}\approx 0$ V). The $R_{PUSH}$ impedance increases while the $R_{PULL}$ impedance stays high ohmic ($R_{PULL}=\infty\Omega$). At time $t_2$, the driver impedance $Z_{DRIVE}$ is adjusted to the target driver impedance $Z_{DRIVE}=120\Omega$. The push resistors 310 and 320 have reached the push impedance $R_{PUSH}=60\Omega$. As a result thereof, the differential driver voltage $V_{DIFF}$ is equal to or smaller than the maximum differential driver voltage $V_{max}$ ($Z_{DRIVE}=120\Omega$). Hence, the driver impedance $Z_{DRIVE}$ is now independent from the differential driver voltage $V_{DIFF}$ and will stay constant at the reached target driver impedance $Z_{DRIVE}=120\Omega$. The push impedance $R_{PUSH}$ is further controlled to increase to the target push impedance $R_{PUSH}=120\Omega$, while at the same time the pull impedance $P_{PULL}$ is controlled to decrease to the target pull impedance $R_{PULL}=120\Omega$. The driver impedance $Z_{DRIVE}$ is maintained constant at the target driver impedance $Z_{DRIVE}=120\Omega$ by the simultaneous adjustment of the push impedance $R_{PUSH}$ and pull impedance $R_{PULL}$.

At time $t_3$, the differential driver voltage $V_{DIFF}$ has reached the recessive differential voltage ($V_{DIFF}\approx 0$ V) of the recessive state. The $R_{PUSH}$ and $R_{PULL}$ impedance have reached the target impedance of $120\Omega$, which maintains the driver impedance $Z_{DRIVE}$ at the target driver impedance $Z_{DRIVE}=120\Omega$. Between time $t_3$ and $t_4$, ringing due to reflection from a poorly terminated network is suppressed because of the driver impedance $Z_{DRIVE}$ at the output stage of the transmitter.

At time $t_4$, before the active recessive period $T_{ACTREC}$ lapses at time $t_5$ (i.e. $t_4-t_1<T_{ACTREC}$), the driver impedance $Z_{DRIVE}$ is adjusted from the target driver impedance $Z_{DRIVE}$ of the active recessive state to a target driver impedance $Z_{DRIVE}$ of the (passive) recessive state, which starts at time $t_5$ (i.e. $t_5-t_1=T_{ACTREC}$).

For instance, between time $t_4$ and $t_5$ the driver impedance $Z_{DRIVE}$ is adjusted from the target driver impedance $Z_{DRIVE}=120\Omega$ of the active recessive state to high ohmic in the (passive) recessive state ($Z_{DRIVE}=\infty\Omega$), which extends until end of the bit time $T_{Bit}$ at time $t_6$ ($t_6-t_1=T_{Bit}$). The push impedances $R_{PUSH}$ as well as the pull impedances $R_{PULL}$ are controlled to simultaneously increase from the target impedances $R_{PUSH}$, $R_{PULL}=120\Omega$ to high ohmic ($R_{PUSH}$, $R_{PULL}=\infty\Omega$) in order to keep the differential driver voltage $V_{DIFF}$ at the recessive differential voltage ($V_{DIFF}\approx 0$ V).

Between time $t_5$ and $t_6$, the driver impedance $Z_{DRIVE}$ stays high ohmic such that a transition from the recessive state to the dominant state may occur at time $t_6$, where the bit time $T_{Bit}$ lapses ($t_6-t_1=T_{Bit}$).

In the above case, the driver impedance $Z_{DRIVE}$ has been adjusted to $120\Omega$ in the active recessive state in order to suppress potential reflections such that a well-terminated network is ensured by the driver impedance $Z_{DRIVE}=120\Omega$ of the actively driving transmitter. In another example, the driver impedance $Z_{DRIVE}$ can be adjusted to a low ohmic impedance (e.g. $R_{DOM}=15\Omega$) in the active recessive state in order to dissipate the energy of potential reflections on the network. It should be noted that it depends on the real case network topology as to whether a target driver impedance $Z_{DRIVE}$ substantially at the termination resistance (described above with reference to FIG. 6) or a low ohmic target driver impedance $Z_{DRIVE}$ (not described in detail in this document) during the active recessive state is more effective in eliminating potential reflections on the network.

A large number of nodes connected to the CAN bus network such as that exemplified with reference to FIGS. 1 and 3 increases the capacitive bus loading. A high capacitive bus loading may limit the maximum attainable data transmission rate due to the passive discharging of the bus capacitance during transition from dominant state to recessive state. The limitation due to passive discharging of the bus capacitance is in particular observed at data transmission rates of 5 Mbit/s and above.

The CAN standard (such as ISO 11898-2:2016) has no requirement on the length of the dominant to recessive edge. However in some applications, the maximum delay from detection of a dominant to recessive transition in the data stream on TXD to a drop of the differential driver voltage $V_{DIFF}=0.5$ V may not exceed a predefined maximum delay such as e.g. a maximum delay of 140 ns. In order to ascertain the compliance with such a predefined maximum delay, which will be referred to also as predefined delay $T_{TXD-BUS}$, may be applied as a maximum duration required for the transmitter to drive high-ohmic the bus starting from the detection of the transition from dominant to recessive.

Referring now to FIG. 8, a signalling diagram showing an example operation of the bus transceiver circuit of FIG. 4 is schematically illustrated. Various ones of the operational parameters, such as: the bit time, $T_{Bit}$; the lowest driver impedance value, $R_{DOM}$; the supply voltage, $V_{CC}$; the termination resistance, $R_{Term}$; and the equivalent bus impedance, $R_{BUS}$, are the same as for the signalling diagram of FIG. 6.

In operation, the CAN bus controller 220 provides a serial bit stream to the CAN transceiver 210 for transmission on the bus 110. The edge detector 330 monitors edges on this bit stream. At time $t_1$, the signal on TXD 251 transitions from low to high, which will cause a dominant to recessive transition of the differential driver voltage $V_{DIFF}$ on the CAN bus 110.

In the dominant state, the push resistors 310 and 320 are controlled to stay at $R_{PUSH}=R_{DOM}=15\Omega$ and the pull resistors 315 and 325 are controlled to stay high ohmic, which results in a low ohmic driver impedance $Z_{DRIVE}=30\Omega$.

In response to the detection of the dominant to recessive transition at time $t_1$, the push resistors 310 and 320 are controlled to increase their impedances from the starting push impedance $R_{PUSH}$=15Ω to a target push impedance $R_{PUSH}$=30Ω, the adjustment is performed continuously over time at a constant change rate in this example. At the same time, the pull resistors 315 and 325 are controlled to decrease their impedances from the starting high ohmic ($R_{PULL}$=∞Ω) to a target pull impedance $R_{PULL}$=30Ω, the adjustment is performed continuously at a constant change rate in this example. The impedances of the push resistors 310 and 320 and the pull resistors 315 and 325 are simultaneously adjusted such that the driver impedance $Z_{DRIVE}$ stays at the driver impedance $Z_{DRIVE}$=30Ω, which is the driver impedance $Z_{DRIVE}$ in dominant state.

The differential driver voltage $V_{DIFF}$ drops for dominant differential voltage ($V_{DIFF}$≈2 V) to the recessive differential voltage ($V_{DIFF}$≈0 V) during impedance adjustment of the push resistors 310 and 320 and the pull resistors 315 and 325.

At time $t_2$, the impedances of the pull resistors 315 and 325 have reached the target push impedance $R_{PUSH}$=30Ω and the differential driver voltage $V_{DIFF}$ is dropped to the recessive differential voltage ($V_{DIFF}$≈0 V).

Starting from the time $t_2$ to a time $t_3$, which corresponds to the end of the predefined delay $T_{TXD\text{-}BUS}$ ($T_3-t_1=T_{TXD\text{-}BUS}$), the impedances of the push resistors 310 and 320 and the pull resistors 315 and 325 are controlled to increase from the current push/pull impedance $R_{PUSH}$, $R_{PULL}$=30Ω to high ohmic driver impedance $Z_{DRIVE}$ of the (passive) recessive state, which starts at time $t_3$. The adjustment is performed continuously over time and at a constant change rate in this example.

The driver impedance $Z_{DRIVE}$ increases, starting from the driver impedance $Z_{DRIVE}$=30Ω to high ohmic driver impedance $Z_{DRIVE}$ of the (passive) recessive state ($Z_{DRIVE}$=∞Ω), in response to the impedance adjustment of the push resistors 310, 320 and the pull resistors 315 and 325.

Maintaining the driver impedance $Z_{DRIVE}$ low ohmic and driving the bus low ohmic during a sub-period $t_2-t_1$ of the predefined maximum delay $T_{TXD\text{-}BUS}$ enables a fast discharge of the loaded charge on a high capacitive bus. Accordingly, a drop of the differential driver voltage $V_{DIFF}$ to a predefined threshold value in response to the detection of a dominant to recessive transition can be ascertained.

The maximum communication speed in practical CAN FD networks can be limited by the differential mode ringing caused by (multiple) reflections bouncing backwards and forwards along the network just after the dominant-to-recessive transition. The recessive state impedance of the transceiver is typically not matched to the characteristic impedance of the cable harness used by original equipment manufacturers (OEMs), such as car makers. The impedance mismatch causes a non-zero reflection coefficient, that gives rise to signals bouncing backwards and forwards around the network until finally a steady state is reached, usually several 100 ns later. To prevent communication errors, all the reflections must have subsided well before the data sample point; no later than 70% of the bit time $T_{bit}$. Hence, there is a direct link between the network topology of the cable harness and the maximum operating bit rate.

Figure 8A:
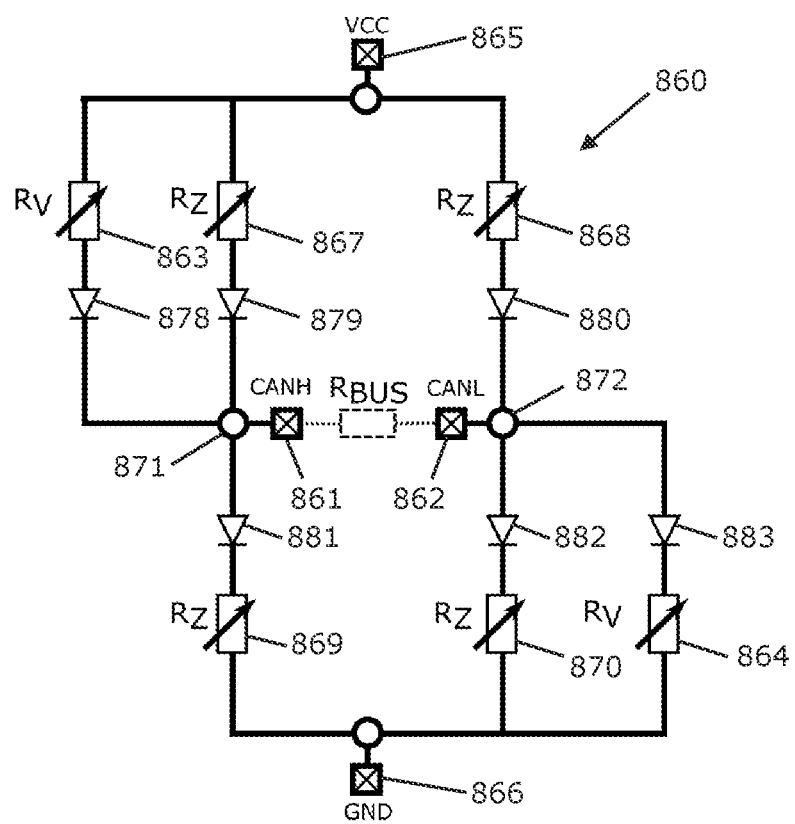
FIG. 8A shows a transmitter circuit according to an example embodiment of the present disclosure.

The circuit of FIG. 4 is very flexible in that the adjustable push and pull resistors, $R_{PUSH}$ and $R_{PULL}$, are independently adjustable such that circuit can be operated in a large number of different operational modes in order to simultaneously adjust the driver impedance $Z_{DRIVE}$ and differential driver voltage $V_{DIFF}$ for a specific application. For example, the values of the adjustable push and pull resistors, $R_{PUSH}$ and $R_{PULL}$, can be set to any one of 100 or more different values such that nearly any arbitrary voltage and impedance wave shape can be generated at the dominant-to-recessive transition, and thus both the wave shape and the reflection coefficient presented to the CAN bus can be controlled. The simultaneous control of the driver impedance $Z_{DRIVE}$ and differential driver voltage $V_{DIFF}$ requires an intricate control of the signals that are setting the resistance values of the adjustable push and pull resistors, $R_{PUSH}$ and $R_{PULL}$ FIG. 8A shows a transmitter circuit 860 according to an example embodiment of the present disclosure. As will be discussed in detail below, the transmitter circuit 860 can be considered as splitting the impedance control from the main transmitter by providing a dedicated impedance setting circuit (that may also be referred to as an "Impedance DAC") to keep the network reflections in check. The impedance setting circuit is placed in parallel with a voltage setting circuit (that may also be referred to as a "Voltage DAC") that takes care of the wave shaping of the CAN transmit signal. Such an implementation can represent an improvement over the circuit of FIG. 4 in terms of a reduction in the amount of hardware that is required to put the circuit into practice, which therefore also represents a more cost effective implementation. This reduction in hardware can include: a reduction in discrete components; a reduction in the amount of silicon if the circuit is implemented on a silicon; or a reduction in the amount of a different material depending upon the technology that is used (e.g. SiGe, GaN, InP, GaAs). The circuit of FIG. 8A can also beneficially result in a relaxation in the accuracy of the timing of the control for setting the impedance of the circuit (as will be discussed below).

The transmitter circuit 860 includes a first bus line terminal, CANH, 861 and a second bus line terminal, CANL, 862, for coupling to a bus such as the CAN bus that is described in detail above. The transmitter circuit 860 also includes a controller (not shown in FIG. 8A) that provides a transmission data signal for the bus. For instance, as described with reference to FIG. 2, such a transmission data signal may be communicated via a TXD connection 251.

As will now be described, the transmitter circuit 860 of FIG. 8A includes: a voltage setting circuit for setting a differential driver voltage $V_{DIFF}$, on the bus; and a separate impedance setting circuit for adjusting a driver impedance, $Z_{DRIVE}$, presented to the bus.

The voltage setting circuit in this implementation includes a first voltage-setting adjustable resistance 863 and a second voltage-setting adjustable resistance 864. The first voltage-setting adjustable resistance 863 is connected in series between a supply terminal, Vcc, 865 and the first bus line terminal, CANH, 861. The second voltage-setting adjustable resistance 864 is connected in series between a reference terminal, GND, 866 and the second bus line terminal, CANL, 862. As will be described with reference to the signalling diagrams of FIGS. 9A and 9B, the controller can set the adjustable resistances 863, 864 of the voltage setting circuit to set the differential driver voltage $V_{DIFF}$, on the bus.

The impedance setting circuit has a first leg and a second leg. Each leg has an adjustable pull-up resistance 867, 868 and an adjustable pull-down resistance 869, 870 connected in series with each other between the supply terminal, Vcc, 865 and the reference terminal, GND, 866. The first leg has a first adjustable pull-up resistance 867 and a first adjustable pull-down resistance 869 connected in series with each other between the supply terminal, Vcc, 865 and the reference terminal, GND, 866. The second leg has a second adjustable pull-up resistance 868 and a second adjustable pull-down resistance 870 connected in series with each other between the supply terminal, Vcc, 865 and the reference terminal, GND, 866. A first-leg-node 871 between the first adjustable pull-up resistance 867 and the first adjustable pull-down resistance 869 of the first leg is connected to one of the two bus terminals (in this example the first bus terminal, CANH, 861). A second-leg-node 872 between the second adjustable pull-up resistance 868 and the second adjustable pull-down resistance 870 of the second leg is connected to the other one of the two bus terminals (in this example the second bus terminal, CANL, 862). As will be described with reference to the signal diagrams of FIGS. 9A and 9B, the controller can set the adjustable resistances 867, 868, 869, 870 of the impedance setting circuit to adjust a driver impedance, $Z_{DRIVE}$, presented to the bus.

Figure 9A:
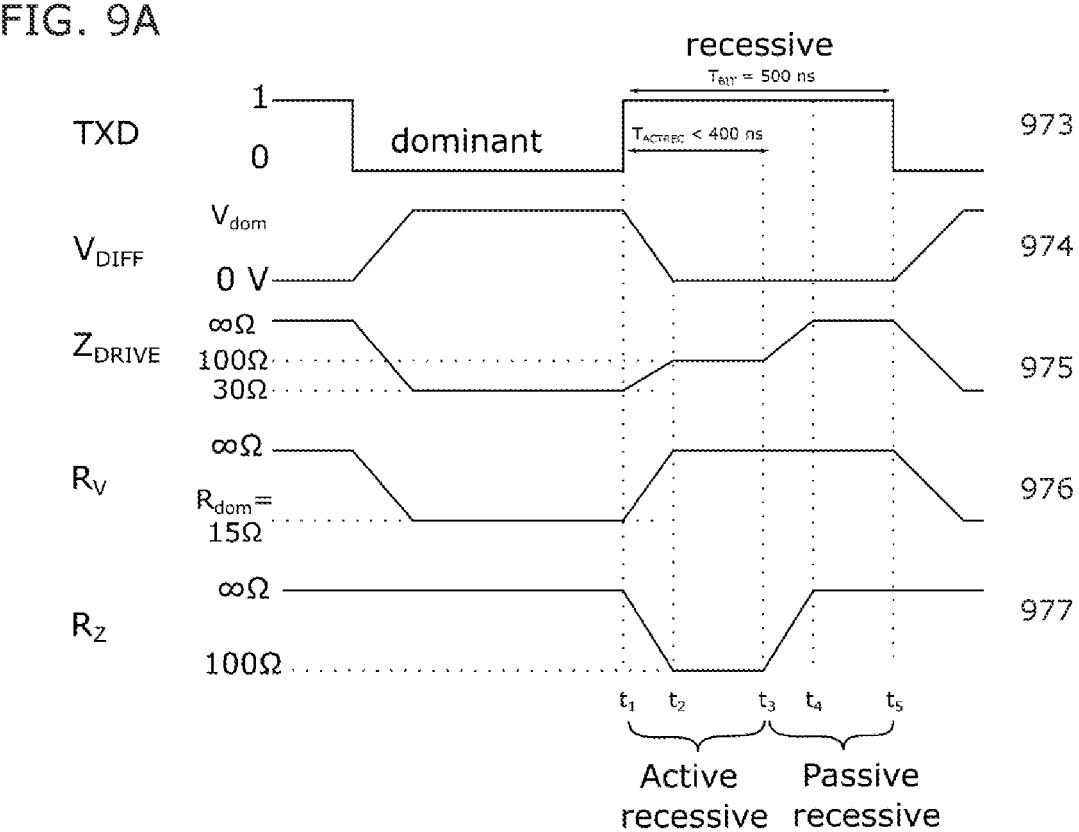
FIG. 9A shows a signaling diagram that is used to describe the operation of the transmitter circuit of FIG. 8A.
Figure 9B:
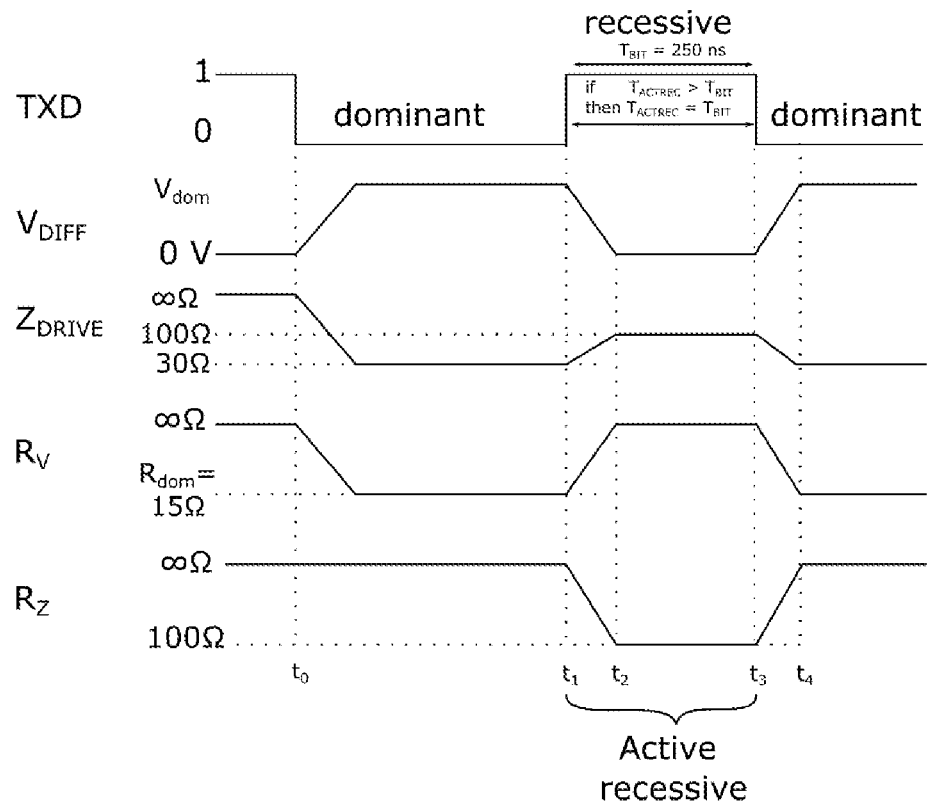
FIG. 9B shows another signalling diagram that is used to describe the operation of the transmitter circuit of FIG. 8A.

FIGS. 9A and 9B show signalling diagrams that will be used to describe the operation of the transmitter circuit of FIG. 8A.

FIG. 9A shows operation where the active recessive time ($T_{ACTREC}$) is shorter in time than the recessive bit ($T_{BIT}$). FIG. 9B shows operation where the actual active recessive time ($T_{ACTREC}$) is cut short such that it stops at the end of the recessive bit time ($T_{BIT}$), and therefore a passive recessive phase does not happen. That is, if the pre-set $T_{ACTREC}$ is larger than $T_{BIT}$, then the actual $T_{ACTREC}$ equals $T_{BIT}$.

The following signals are shown in FIGS. 9A and 9B:
The transmission data signal, TXD, 973;
The differential driver voltage, $V_{DIFF}$, on the bus 974;
The driver impedance, $Z_{DRIVE}$, that is presented to the bus by the transmitter circuit 975;
The resistance value of the adjustable resistances 863, 864 of the voltage setting circuit 976; and
The resistance value of the adjustable resistances 867, 868, 869, 870 of the impedance setting circuit 977.

Each of the adjustable resistances 863, 864 of the voltage setting circuit are controlled such that they have the same resistance value. Similarly, each of the adjustable resistances 867, 868, 869, 870 of the impedance setting circuit are controlled such that they have the same resistance value.

Referring first to FIG. 9A, the controller that is associated with the transmitter circuit of FIG. 8A can detect a transition in the transmission data signal 973, and in response to a dominant to recessive transition it: adjusts each of the adjustable pull-up resistances 867, 868 and the adjustable pull-down resistances 869, 871 of the impedance setting circuit with the same target impedance profile such that the transmitter circuit drives the bus with a target driver impedance, $Z_{DRIVE}$, for a predefined subperiod, $T_{ACTREC}$, of a bit time ($T_{Bit}$).

The target impedance profile is shown in FIG. 9A by the signal 977 that indicates the resistance value of the adjustable resistances 867, 868, 869, 870 of the impedance setting circuit. The target impedance profile comprises a first resistance transition and a second resistance transition. The first resistance transition represents a transition (a gradual and smooth transition in this example) from a high ohmic value ($\infty\Omega$) at $t_1$ to a predetermined resistance value (100Ω in this example) at $t_2$. This period between $t_1$ and $t_2$ is at the start of the predefined subperiod, $T_{ACTREC}$, of the bit time, $T_{bit}$. The second resistance transition represents a transition (again, a gradual and smooth transition in this example) from the predetermined resistance value (100Ω in this example) at $t_3$ to the high ohmic value ($\infty\Omega$) at $t_4$. The increase of the resistance value of the adjustable resistances 867, 868, 869, 870 of the impedance setting circuit (signal 977 in FIG. 9A) from 100Ω at $t_3$ represents the end of the predefined subperiod, $T_{ACTREC}$, of the bit time, $T_{Bit}$.

The controller then adjusts the adjustable pull-up resistances 867, 868 and the adjustable pull-down resistances 869, 870 of the impedance setting circuit such that the transmitter circuit drives the bus high ohmic for a remaining subperiod of the bit time, $T_{Bit}$. This is shown in FIG. 9A where the signal 977 that indicates the resistance value of the adjustable resistances 867, 868, 869, 870 of the impedance setting circuit transitions (gradually and smoothly in this example) from 100Ω at $t_3$ to a high resistance value ($\infty\Omega$) at $t_4$, and then stays at the high resistance value ($\infty\Omega$) until $t_5$. The predefined subperiod, $T_{ACTREC}$, of the bit time ($T_{Bit}$) between $t_1$ and $t_3$ can be referred to as an active recessive subperiod of the recessive period. The remaining subperiod of the bit time, $T_{Bit}$, between $t_3$ and $t_5$, can be referred to as a passive recessive subperiod of the recessive period. In this way, a "slow release" of the resistance value of the adjustable resistances 867, 868, 869, 870 of the impedance setting circuit (signal 977 in FIG. 9A) (between $t_3$ and $t_4$) towards the traditional recessive state (high impedance) occurs at the end of the active recessive phase.

In some examples, the controller can include a shift register that stores a sequence of values that define the target impedance profile. The controller can then adjust each of the adjustable pull-up resistances 867, 868 and the adjustable pull-down resistances 869, 870 of the impedance setting circuit according to the sequence of values that are stored in the shift register in response to the dominant to recessive transition at the TXD input 251 (signal 973).

Since both the adjustable pull-up resistances 867, 868 and the adjustable pull-down resistances 869, 870 are changed in the same way at the same time, this does not cause a significant change in the differential driver voltage, $V_{DIFF}$, on the bus (if any). This is because the change in the resistance values of the adjustable resistances 867, 868, 869, 870 of the impedance setting circuit will be common mode and not result in an (observable) differential mode voltage excitation on the CAN bus. Although the transceiver circuit of FIG. 8A has more components than the circuit of FIG. 6, the impedance control in FIG. 8A has advantageously become pure common mode control such that any mishap or slight mis-timing in the control of the impedance setting circuit will not result in (significant) differential mode excitation.

Turning now to FIG. 9B, operation is illustrated for which a passive recessive phase does not exist because the bit time is shorter than the pre-set active recessive time, and therefore the actual active recessive bit time ($T_{ACTREC}$) is made to be equal to the recessive bit time ($T_{BIT}$). This can occur at high data rates.

As shown in FIG. 9B, a long recessive bit before $t_0$ keeps the bus in passive recessive, and at $t_0$ the bus goes from passive recessive to dominant. At $t_1$ the bus goes from dominant to active recessive, and at $t_3$ the bus goes from active recessive directly to dominant. Once the transmission data signal (TXD) goes down, the impedance setting circuit will start to increase its impedance from the active recessive impedance to infinite impedance.

Returning to FIG. 8A, the voltage setting circuit further comprises a first diode 878 and a second diode 883.

The first diode 878 is connected in series with the first voltage-setting adjustable resistance 863 between the supply terminal, Vcc, 865 and the first bus line terminal, CANH, 861. More particularly, the anode of the first diode 878 is connected, either directly or indirectly, to the supply terminal, Vcc, 865. The cathode of the first diode 878 is connected, either directly or indirectly, to the first bus line terminal, CANH, 861.

The second diode 883 is connected in series with the second voltage-setting adjustable resistance 864 between the second bus line terminal, CANL, 862, and the reference terminal, GND, 866. The anode of the second diode 883 is connected, either directly or indirectly, to the second bus line terminal, CANL, 862. The cathode of the second diode 883 is connected, either directly or indirectly, to the reference terminal, GND, 866.

The impedance setting circuit further comprises: a first-leg-first-diode 879; a first-leg-second-diode 881; a second-leg-first-diode 880; and a second-leg-second-diode 882.

The first-leg-first-diode 879 is connected in series with the adjustable pull-up resistance 867 of the first leg between: i) the supply terminal, Vcc, 865; and ii) the first-leg-node 871. The anode of the first-leg-first-diode 879 is connected, either directly or indirectly, to the supply terminal, Vcc, 865. The cathode of the first-leg-first-diode 879 is connected, either directly or indirectly, to the first-leg-node 871.

The first-leg-second-diode 881 is connected in series with the adjustable pull-down resistance 869 of the first leg between: i) the first-leg-node 871; and ii) the reference terminal, GND, 866. The anode of the first-leg-second-diode 879 is connected, either directly or indirectly, to the first-leg-node 871. The cathode of the first-leg-second-diode 881 is connected, either directly or indirectly, to the reference terminal, GND, 866.

The second-leg-first-diode 880 is connected in series with the adjustable pull-up resistance 868 of the first leg between: i) the supply terminal, Vcc, 865; and ii) the second-leg-node 872. The anode of the second-leg-first-diode 880 is connected, either directly or indirectly, to the supply terminal, Vcc, 865. The cathode of the second-leg-first-diode 880 is connected, either directly or indirectly, to the second-leg-node 872.

The second-leg-second-diode 882 is connected in series with the adjustable pull-down resistance 870 of the second leg between: i) the second-leg-node 872; and ii) the reference terminal, GND, 866. The anode of the second-leg-second-diode 882 is connected, either directly or indirectly, to the second-leg-node 872. The cathode of the second-leg-second-diode 882 is connected, either directly or indirectly, to the reference terminal, GND, 866.

As indicated above, in response to detecting a dominant to recessive transition in the transmission data signal 973 the controller sets the adjustable resistances 863, 864 of the voltage setting circuit to set the differential driver voltage $V_{DIFF}$, on the bus 974 to a recessive value. This is illustrated in FIG. 9A where, during the recessive period, the signal 976 that indicates the resistance value of the adjustable resistances 863, 864 of the voltage setting circuit transitions (gradually and smoothly in this example) from a predetermined value ($R_{dom}=15\Omega$ in this example) at $t_1$ to a high resistance value ($\infty\Omega$) at $t_2$ such that $V_{DIFF}$ changes from a high value to a low value. It is the change in the adjustable resistances 863, 864 of the voltage setting circuit that cause the change in the differential driver voltage $V_{DIFF}$, on the bus 974; the change in the adjustable resistances 867, 868, 869, 870 of the impedance setting circuit do not cause a change in the differential driver voltage $V_{DIFF}$, on the bus 974.

In this way, using the principle of superposition, simultaneous control of the differential driver voltage $V_{DIFF}$ (output voltage) and the driver impedance $Z_{DRIVE}$ (output impedance) can be obtained with two independent circuits.

Although the transmitter circuit of FIG. 8A may appear more complex than the circuit of FIG. 4, it does not require the same intricate control of the adjustable resistances 867, 868, 869, 870 of the impedance setting circuit. It is sufficient to control the adjustable resistances 867, 868, 869, 870 of the impedance setting circuit impedance near the dominant-to-recessive transition; precise control is not required to keep the impedance control in lock step with the voltage transition. Therefore, both functions (voltage control and impedance control) have become orthogonal. The transmitter circuit includes separate circuits, each working in their own domain—that is, differential mode voltage shaping and common mode impedance control.

This independence between the voltage control and the impedance control can open up the possibility for SoC (system on a chip) integrators to use the transmitter circuit of FIG. 8A as a module that can be used in one of two ways:
- according to the signal diagrams that are illustrated in FIGS. 9A and 9B to reduce ringing such that higher bit rates can be achieved; or
- if the transmitter circuit is to be used in a classical CAN FD application, then the adjustable resistances 867, 868, 869, 870 of the impedance setting circuit can be set to be high ohmic (in the same way as the passive recessive state that is shown in FIG. 9A) such that they do not significantly influence the operation of the transmitter circuit. In which case, the differential driver voltage $V_{DIFF}$ can be set by adjusting the adjustable resistances 863, 864 of the voltage setting circuit.

Figure 8B:
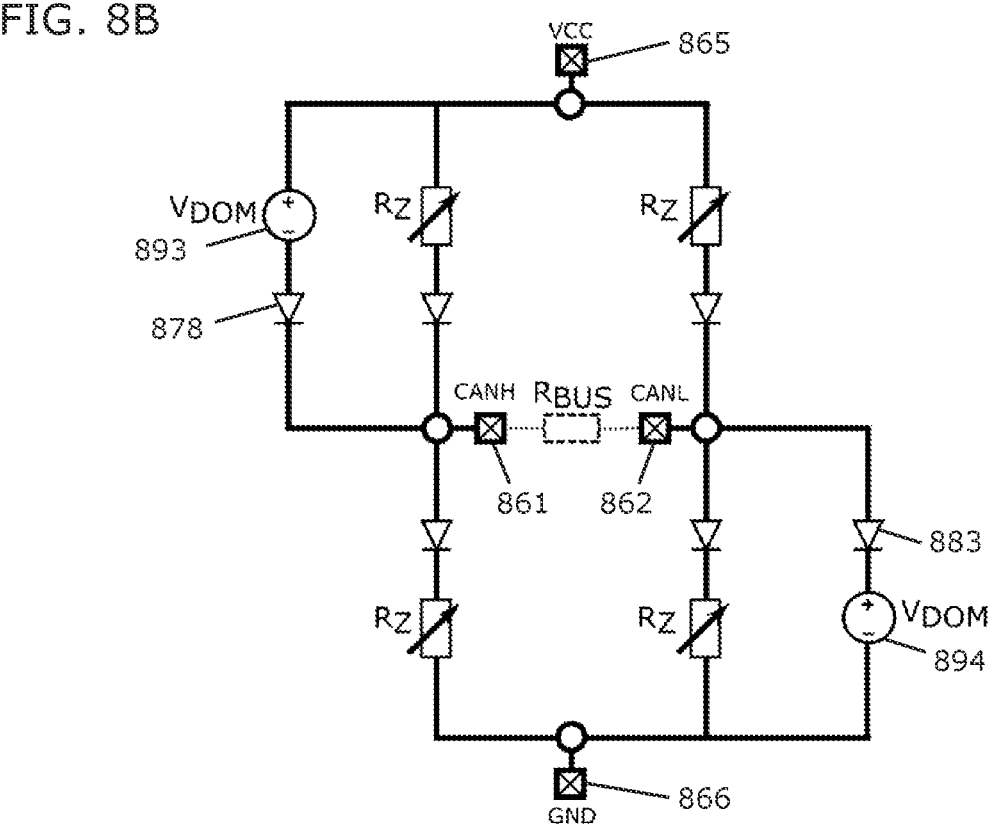
FIG. 8B shows a transmitter circuit according to another example embodiment of the present disclosure.

FIG. 8B shows a transmitter circuit according to an example embodiment of the present disclosure. In FIG. 8B the voltage setting circuit is implemented differently to the voltage setting circuit of FIG. 8A.

In this example, the voltage setting circuit includes a first voltage source 893 and a second voltage source 894. The first voltage source 893 is configured to set a first voltage at the first bus line terminal, CANH, 861. The second voltage source 864 is configured to set a second voltage at the second bus line terminal, CANL, 862. In FIG. 8B, the first voltage source is connected between the supply terminal, Vcc, 865 and the first bus line terminal, CANH, 861. The second voltage source 864 is connected between the second bus line terminal, CANL, 862, and the reference terminal, GND, 866.

In the same way as FIG. 8A, the voltage setting circuit in FIG. 8B includes a first diode 878 and a second diode 883. The first diode 878 is connected in series with the first voltage source 893 between the supply terminal, Vcc, 865 and the first bus line terminal, CANH, 861. The second diode 883 is connected in series with the second voltage source 894 between the second bus line terminal, CANL, 862, and the reference terminal, GND, 866.

Figure 10:
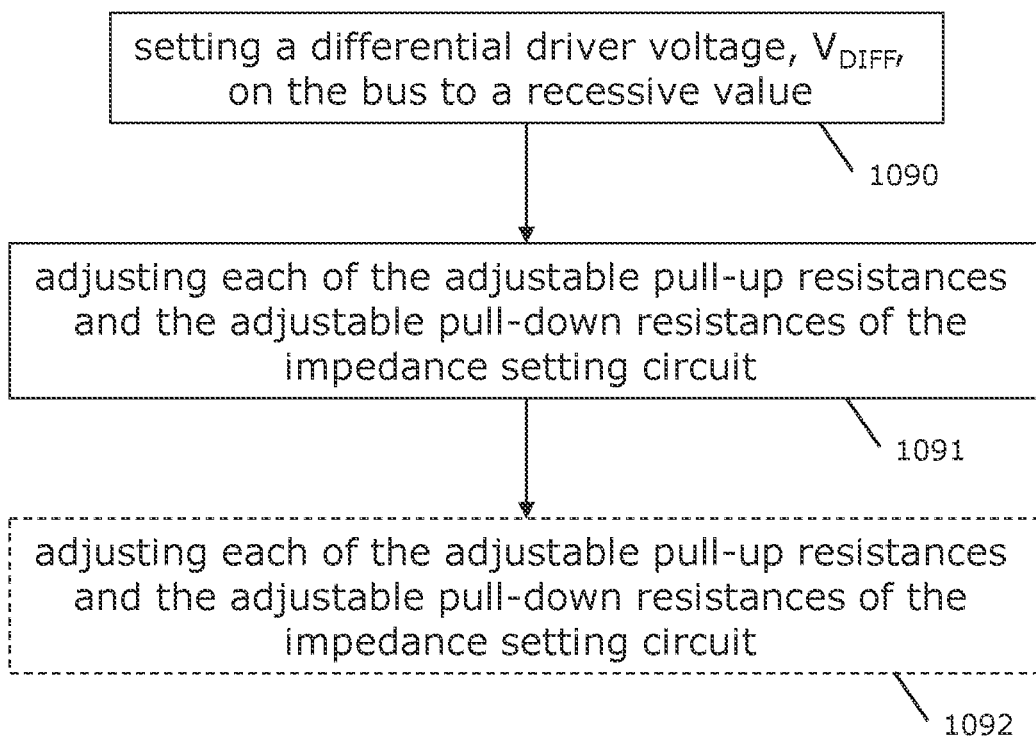
FIG. 10 shows a method of operating a transmitter circuit according to an example embodiment of the present disclosure.

A controller (not shown) can control the first and second voltage sources 893, 894 in order to set the differential driver voltage $V_{DIFF}$, on the bus in the same way that is illustrated in FIG. 10.

Figure 8C:
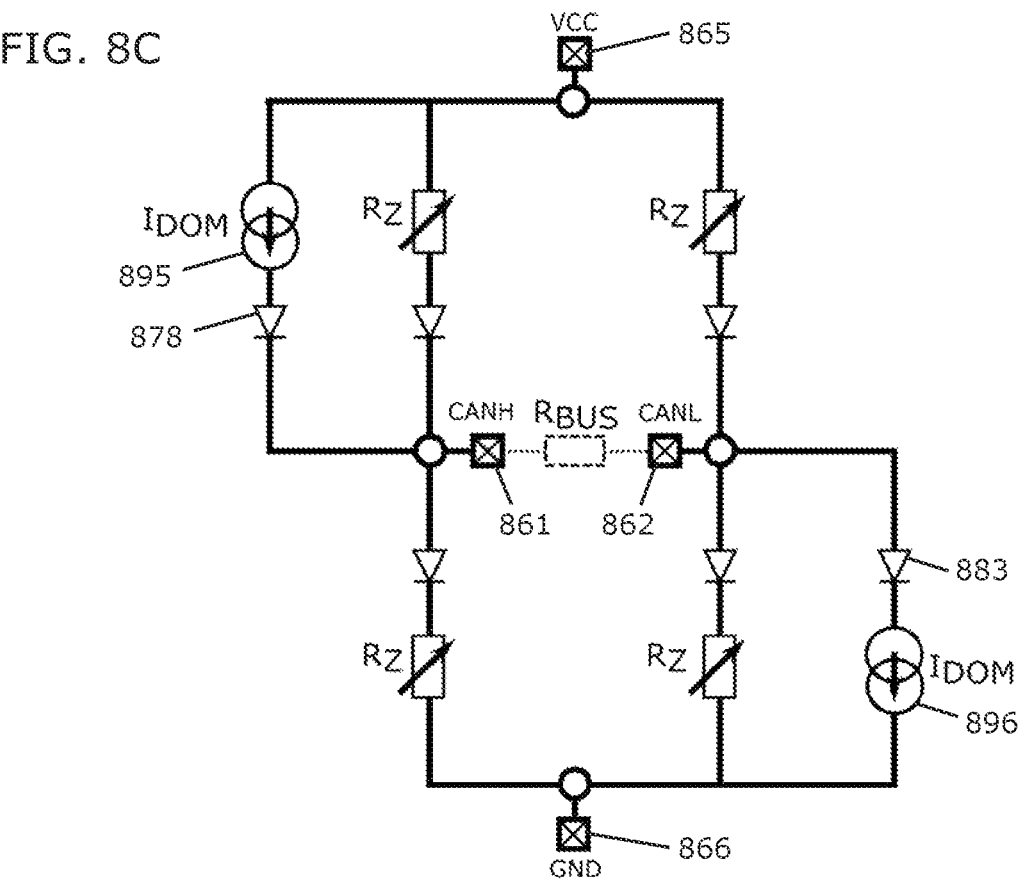
FIG. 8C shows a transmitter circuit according to a yet further example embodiment of the present disclosure.

FIG. 8C shows a transmitter circuit according to a yet further example embodiment of the present disclosure. In FIG. 8C the voltage setting circuit is implemented differently to the voltage setting circuits of FIGS. 8A and 8B.

In this example, the voltage setting circuit includes a first adjustable current source 895 and a second adjustable current source 896. The first and second adjustable current sources 895, 896 source current through the bus impedance $R_{BUS}$ in order to set the differential driver voltage, $V_{DIFF}$, on the bus. In FIG. 8C, the first adjustable current source 895 is connected between the supply terminal, Vcc, 865 and the first bus line terminal, CANH, 861. The second adjustable current source 896 is connected between the second bus line terminal, CANL, 862, and the reference terminal, GND, 866.

In the same way as FIGS. 8A and 8B, the voltage setting circuit in FIG. 8C includes a first diode 878 and a second diode 883. The first diode 878 is connected in series with the first adjustable current source 895 between the supply terminal, Vcc, 865 and the first bus line terminal, CANH, 861. The second diode 883 is connected in series with the second adjustable current source 896 between the second bus line terminal, CANL, 862, and the reference terminal, GND, 866.

A controller (not shown) can control the first and second adjustable current sources 895, 896 in order to set the differential driver voltage $V_{DIFF}$, on the bus in the same way that is illustrated in FIG. 10.

This ability of the transmitter circuits of FIGS. 8A, 8B and 8C to be used in a modular way provides advantageous flexibility in the way that the circuit can be used in various applications. For example, the impedance setting circuit of these transmitter circuits can be retrofitted to existing systems that already have a voltage setting circuit without affecting the functionality of the pre-existing voltage setting circuit. This is because, as indicated above, the function of the impedance control can be considered as orthogonal to the function of voltage control.

FIG. 10 shows a method of operating a transmitter circuit according to an example embodiment of the present disclosure. The transmitter circuit can be the one that is illustrated in any of FIGS. 8A-8C.

The method comprises the following steps that are performed in response to detecting a dominant to recessive transition:
  step 1090—setting a differential driver voltage, $V_{DIFF}$, on the bus 30 to a recessive value. This step can be performed by controlling any of the voltage setting circuits disclosed herein; and
  step 1091—adjusting each of the adjustable pull-up resistances and the adjustable pull-down resistances of the impedance setting circuit with the same target impedance profile such that the transmitter circuit drives the bus with a target driver impedance, $Z_{DRIVE}$, for an active recessive period $T_{ACTREC}$, of a bit time, $T_{Bit}$.

FIG. 10 also shows an optional further step, step 1092 which is preformed if the recessive bit is longer in time than the active recessive time, $T_{ACTREC}$, in which case the active recessive period $T_{ACTREC}$, of a bit time, $T_{Bit}$, is a predefined subperiod, $T_{ACTREC}$, of a bit time, $T_{Bit}$. Step 1092 then includes adjusting the adjustable pull-up resistances and the adjustable pull-down resistances of the impedance setting circuit such that the transmitter circuit drives the bus high ohmic for a remaining subperiod of the bit time, $T_{Bit}$.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:
1. A transmitter circuit, comprising:
  a first bus line terminal and a second bus line terminal for coupling to a bus;
  a controller, wherein the controller is configured to provide a transmission data signal for the bus;
  a voltage setting circuit configured to set a differential driver voltage on the bus;
  an impedance setting circuit that has a first leg and a second leg, wherein each leg comprises an adjustable pull-up resistance and an adjustable pull-down resistance connected in series with each other between a supply terminal and a reference terminal, wherein:
    a first-leg-node between the adjustable pull-up resistance and the adjustable pull-down resistance of the first leg is connected to one of the first bus line terminal or the second bus line terminal; and
    a second-leg-node between the adjustable pull-up resistance and the adjustable pull-down resistance of the second leg is connected to another one of the first bus line terminal or the second bus line terminal, and wherein the controller is configured to set the adjustable pull-up resistance and the adjustable pull-down resistance of the impedance setting circuit to adjust a driver impedance presented to the bus; and wherein the controller is configured to detect a transition in the transmission data signal, and in response to a dominant to recessive transition the controller is configured to:

control the voltage setting circuit such that is sets the differential driver voltage on the bus to a recessive value;

adjust each of the adjustable pull-up resistances and the adjustable pull-down resistances of the impedance setting circuit with the same target impedance profile such that the transmitter circuit drives the bus with a target driver impedance for an active recessive period of a bit time.

2. The transmitter circuit of claim 1, wherein, in response to the detected dominant to recessive transition, the controller is configured to:

adjust each of the adjustable pull-up resistances and the adjustable pull-down resistances of the impedance setting circuit with the same target impedance profile such that the transmitter circuit drives the bus with the target driver impedance for a predefined subperiod the bit time; and adjust the adjustable pull-up resistances and the adjustable pull-down resistances of the impedance setting circuit such that the transmitter circuit drives the bus with a driver impedance that is high ohmic for a remaining subperiod of the bit time.

3. The transmitter circuit of claim 2, wherein the target impedance profile comprises a first resistance transition and a second resistance transition, wherein:

the first resistance transition represents a transition from a high ohmic value to a predetermined resistance value at the start of the predefined subperiod of the bit time; and the second resistance transition represents a transition from the predetermined resistance value to the high ohmic value at the end of the predefined subperiod of the bit time.

4. The transmitter circuit of claim 3, wherein the controller is configured to maintain the adjustable pull-up resistances and the adjustable pull-down resistances of the impedance setting circuit at the high ohmic value for the remaining subperiod of the bit time.

5. The transmitter circuit of claim 1, wherein the voltage setting circuit comprises:

a first voltage source that is configured to set a first voltage at the first bus line terminal; and a second voltage source that is configured to set a second voltage at the second bus line terminal.

6. The transmitter circuit of claim 1, wherein the voltage setting circuit comprises:

a first voltage-setting adjustable resistance connected in series between a supply terminal and the first bus line terminal; and a second voltage-setting adjustable resistance connected in series between the second bus line terminal and a reference terminal.

7. The transmitter circuit of claim 6, wherein the voltage setting circuit further comprises:

a first diode connected in series with the first voltage-setting adjustable resistance between the supply terminal and the first bus line terminal; and a second diode connected in series with the second voltage-setting adjustable resistance between the second bus line terminal and the reference terminal.

8. The transmitter circuit of claim 6, wherein the controller is configured to:

transition values of the voltage-setting adjustable resistances of the voltage setting circuit from a predetermined value to a high ohmic value in response to the dominant to recessive transition in the transmission data signal in order to set the differential driver voltage on the bus to the recessive value.

9. The transmitter circuit of claim 1, wherein the voltage setting circuit comprises:

a first adjustable current source connected in series between a supply terminal and the first bus line terminal; and a second adjustable current source connected in series between the second bus line terminal and a reference terminal.

10. The transmitter circuit of claim 9, wherein the voltage setting circuit further comprises:

a first diode connected in series with the first adjustable current source between the supply terminal and the first bus line terminal; and a second diode connected in series with the second adjustable current source between the second bus line terminal and the reference terminal.

11. The transmitter circuit of claim 1, wherein the impedance setting circuit further comprises:

a first-leg-first-diode connected in series with the adjustable pull-up resistance of the first leg between: i) the supply terminal; and ii) the first-leg-node;

a first-leg-second-diode connected in series with the adjustable pull-down resistance of the first leg between: i) the first-leg-node; and ii) the reference terminal;

a second-leg-first-diode connected in series with the adjustable pull-up resistance of the first leg between: i) the supply terminal; and ii) the second-leg-node;

a second-leg-second-diode connected in series with the adjustable pull-down resistance of the second leg between: i) the second-leg-node; and ii) the reference terminal.

12. The transmitter circuit of claim 1, wherein the controller comprises a shift register that stores a sequence of values that define the target impedance profile, and wherein the controller is configured to:

adjust each of the adjustable pull-up resistances and the adjustable pull-down resistances of the impedance setting circuit according to the sequence of values that are stored in the shift register in response to the dominant to recessive transition.

13. A CAN network comprising one or more transmitter circuits, wherein the one or more transmitted circuits each comprise:

a first bus line terminal and a second bus line terminal for coupling to a bus;

a controller, wherein the controller is configured to provide a transmission data signal for the bus;

a voltage setting circuit configured to set a differential driver voltage on the bus;

an impedance setting circuit that has a first leg and a second leg, wherein each leg comprises an adjustable pull-up resistance and an adjustable pull-down resistance connected in series with each other between the supply terminal and the reference terminal, wherein:
  a first-leg-node between the adjustable pull-up resistance and the adjustable pull-down resistance of the first leg is connected to one of the first bus line terminal or the second bus line terminal; and
  a second-leg-node between the adjustable pull-up resistance and the adjustable pull-down resistance of the second leg is connected to another one of the first bus line terminal or the second bus line terminal, and
wherein the controller is configured to set the adjustable pull-up resistance and the adjustable pull-down resistance of the impedance setting circuit to adjust a driver impedance presented to the bus; and
wherein the controller is configured to detect a transition in the transmission data signal, and in response to a dominant to recessive transition the controller is configured to:
  control the voltage setting circuit such that is sets the differential driver voltage on the bus to a recessive value;
  adjust each of the adjustable pull-up resistances and the adjustable pull-down resistances of the impedance setting circuit with the same target impedance profile such that the transmitter circuit drives the bus with a target driver impedance for an active recessive period of a bit time.

14. A method of operating a transmitter circuit, wherein the transmitter circuit comprises:
  a first bus line terminal and a second bus line terminal for coupling to a bus;
  an impedance setting circuit that has a first leg and a second leg, wherein each leg comprises an adjustable pull-up resistance and an adjustable pull-down resistance connected in series with each other between the supply terminal and the reference terminal, wherein:
    a first-leg-node between the adjustable pull-up resistance and the adjustable pull-down resistance of the first leg is connected to one of the first bus line terminal or the second bus line terminal; and
    a second-leg-node between the adjustable pull-up resistance and the adjustable pull-down resistance of the second leg is connected to another one of the first bus line terminal or the second bus line terminal,
wherein the method comprises detecting a transition in a transmission data signal, and in response to a dominant to recessive transition in the transmission data signal:
  setting a differential driver voltage on the bus to a recessive value; and
  adjusting each of the adjustable pull-up resistances and the adjustable pull-down resistances of the impedance setting circuit with the same target impedance profile such that the transmitter circuit drives the bus with a target driver impedance for an active recessive period, of a bit time.

* * * * *